United States Patent
Miyamoto et al.

(10) Patent No.: US 6,512,077 B1
(45) Date of Patent: Jan. 28, 2003

(54) POLYCARBONATE-BASE FLAME-RETARDANT RESIN COMPOSITION

(75) Inventors: Akira Miyamoto; Hiroshi Hachiya; Nobutsugu Nanba, all of Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/889,044

(22) PCT Filed: Mar. 24, 2000

(86) PCT No.: PCT/JP00/01839

§ 371 (c)(1),
(2), (4) Date: Jul. 11, 2001

(87) PCT Pub. No.: WO00/58402

PCT Pub. Date: Oct. 5, 2000

(30) Foreign Application Priority Data

Mar. 26, 1999 (JP) .......................................... 11-082809

(51) Int. Cl.$^7$ ............................................... C08G 64/00
(52) U.S. Cl. ........................................ 528/196; 528/198
(58) Field of Search ................................. 528/196, 198

(56) References Cited

FOREIGN PATENT DOCUMENTS

| JP | 2199162 A | 8/1990 |
|----|-----------|--------|
| JP | 5271505 A | 10/1993 |
| JP | 0936243 A2 | 8/1999 |

*Primary Examiner*—Terressa M. Boykin
(74) *Attorney, Agent, or Firm*—Birch, Stewart, Kolasch & Birch, LLP

(57) ABSTRACT

Disclosed is a flame retardant polycarbonate resin composition, which comprises 50 to 98 parts by weight of an aromatic polycarbonate (A), 0.1 to 49 parts by weight of a copolymer (B) comprising an aromatic vinyl monomer unit (b-1) and a vinyl cyanide monomer unit (b-2), 0.5 to 30 parts by weight of a cyanide-containing, graft copolymer (C) obtained by copolymerizing an aromatic vinyl compound (c-1) and a vinyl cyanide compound (c-2) in the presence of a rubbery polymer (c-3), 0.5 to 30 parts by weight of a (meth)acrylate-containing, graft copolymer (D) obtained by copolymerizing an aromatic vinyl compound (d-1) and an alkyl (meth)acrylate (d-2) in the presence of a rubbery butadiene polymer (d-3), and 0.1 to 30 parts by weight of at least one organic phosphorus compound oligomer (E), wherein the total amount of the components (A), (B), (C) and (D) is 100 parts by weight.

9 Claims, 3 Drawing Sheets

1 μm

1 μm

POLYCARBONATE-BASE FLAME-RETARDANT RESIN COMPOSITION

This application is the national phase under 35 U.S.C. § 371 of PCT International Application No. PCT/JP00/01839 which has an International filing date of Mar. 24, 2000, which designated the United States of America and was not published in English.

BACKGROUND OF THE INVENTION

1. Field of the Invention

The present invention relates to a flame retardant polycarbonate resin composition. More particularly, the present invention is concerned with a flame retardant polycarbonate resin composition, which comprises, in a specific ratio, an aromatic polycarbonate (A), a copolymer (B) comprising an aromatic vinyl monomer unit (b-1) and a vinyl cyanide monomer unit (b-2), a cyanide-containing, graft copolymer (C) obtained by copolymerizing an aromatic vinyl compound (c-1) and a vinyl cyanide compound (c-2) in the presence of a rubbery polymer (c-3), a (meth)acrylate-containing, graft co-polymer (D) obtained by copolymerizing an aromatic vinyl compound (d-1) and an alkyl (meth)acrylate (d-2) in the presence of a rubbery butadiene polymer (d-3), and at least one organic phosphorus compound oligomer (E). The resin composition of the present invention not only simultaneously exhibits excellent melt fluidity, impact resistance, thermal resistance and flame retardancy, but also has high stability in mechanical properties. Further, the occurrence of a mold deposit (MD) during the molding of such a resin composition is very small. By virtue of these excellent characteristics, the resin composition of the present invention has advantages for use in various industrial fields.

2. Prior Art

A resin composition comprising a polycarbonate (PC), an ABS (acrylonitrile-butadiene-styrene) resin and a phosphorus-containing flame retardant (such a resin composition is hereinafter, frequently referred to as a "PC/ABS/phosphorus-containing flame retardant composition") is a flame retardant resin composition which is free from a chlorine/iodide flame retardant. Such a flame retardant resin composition exhibits excellent mechanical properties and thermal resistance, and hence, it has been widely used as a material for housings in electric appliances and office automation machines, such as computers, printers, word processors and copying machines.

The technologies concerning the PC/ABS/phosphorus-containing flame retardant composition are described, for example, in the following patent documents: Unexamined Japanese Patent Application Laid-Open Specification No. 2-32154 (corresponding to U.S. Pat. No. 5,061,745); Unexamined Japanese Patent Application Laid-Open Specification No. 2-115262 (corresponding to U.S. Pat. No. 5,204,394); Unexamined Japanese Patent Application Laid-Open Specification Nos. 4-285655, 4-298554, 4-300937, 6-192553 and 6-228364; Unexamined Japanese Patent Application Laid-Open Specification No. 6-240127 (corresponding to W093/22382); Unexamined Japanese Patent Application Laid-Open Specification Nos. 7-11119, 7-26129, 7-33971, 7-82466, 7-145307, 7-150028, 7-196871, 7-196872, 7-196873, 7-196874, 7-331045, 7-331051, 8-3397, 8-34916, 8-34926, 8-67810 and 8-120169; Unexamined Japanese Patent Application Laid-Open Specification No. 8-127686 (corresponding to W096/07704); Unexamined Japanese Patent Application Laid-Open Specification Nos. 8-165392, 8-225737, 8-277344, 8-208972, 9-3312, 9-48912, 9-95610, 9-104811, 9-124920 and 9-143357; Unexamined Japanese Patent Application Laid-Open Specification No. 9-165518 (corresponding to EP747424); Unexamined Japanese Patent Application Laid-Open Specification Nos. 9-176471 and 9-183893; Unexamined Japanese Patent Application Laid-Open Specification No. 9-188808 (corresponding to EP771851); and Unexamined Japanese Patent Application Laid-Open Specification No. 9-194713.

In accordance with the recent tendency to reduce the weight and wall thickness of the above-mentioned types of machines, there has been a demand for a PC/ABS/phosphorus-containing flame retardant composition which simultaneously exhibits a high melt fluidity and a high impact resistance and which can therefore be advantageously used for producing light-weight and small-thickness shaped articles. However, in the above-mentioned patent documents, a PC/ABS/phosphorus-containing flame retardant composition which simultaneously exhibits satisfactorily high melt fluidity and impact resistance has not been obtained.

It has been attempted to produce a PC/ABS/phosphorus-containing flame retardant composition having a high melt fluidity by increasing the amount of ABS or SAN (styrene-acrylonitrile copolymer) contained in the resin composition. However, the obtained resin composition has a problem in that the flame retardancy of the resin composition becomes unsatisfactory so that a dripping of flaming particles is likely to occur when the resin composition is on fire. Further, such a resin composition has problems in that the impact resistance and the thermal resistance of the resin composition become low. It has also been attempted to improve the melt fluidity of a PC/ABS/phosphorus-containing flame retardant composition by using a low molecular weight polycarbonate. However, in this attempt, the impact resistance of the obtained resin composition is lowered.

Unexamined Japanese Patent Application Laid-Open Specification No. 62-25179 discloses a resin composition containing a polycarbonate, ABS and MBS (methyl methacrylate-butadiene-styrene copolymer) and U.S. Pat. No. 4,390,657 discloses a resin composition containing a polycarbonate, ABS, and an acrylic rubber-containing multi-phase composite interpolymer which is obtained by graft copolymerizing an acrylate monomer onto a butyl acrylate rubber. These patent documents describe that these resin compositions are improved in weld strength and low temperature impact resistance. However, these patent documents disclose neither a technique for improving the melt fluidity of a resin composition nor a technique for improving the flame retardancy of a resin composition. In addition, the improvement in impact resistance achieved by the use of the acrylic rubber-containing multi-phase composite interpolymer is unsatisfactory.

Unexamined Japanese Patent Application Laid-Open Specification No. 6-240127 (corresponding to WO 93/22382) and Unexamined Japanese Patent Application Laid-Open Specification No. 8-3397 disclose the use of a specialty rubber in combination with the PC/ABS/phosphorus-containing flame retardant composition in which a phosphorus compound oligomer is used as the flame retardant, wherein the specialty rubber is a complex rubber (silicone-acrylic complex rubber) obtained by a process comprising graft polymerizing a vinyl monomer onto a complex rubber comprising a polyorganosiloxane and a polyalkyl (meth)acrylate. The silicone-acrylic complex rubber used in the above-mentioned patent documents exhibits only a low reactivity with a rubber comprising a polyorganosiloxane and a polyalkyl (meth)acrylate and, accordingly, the graft polymerization of a vinyl monomer onto the above-mentioned rubber becomes difficult. Therefore, the methods disclosed in the above-mentioned patent documents are disadvantageous not only in that a complicated process is required for the production of a silicone-acrylic complex rubber, but also in that the production cost becomes high. Further, when a silicone-acrylic complex rubber is used in combination with a PC/ABS/phosphorus-containing flame retardant composition, the resultant resin composition has a disadvantage that the impact resistance is likely to be lowered during the residence of the resin composition in a molding machine for producing a molded article.

In a PC/ABS/phosphorus-containing flame retardant composition, the high thermal resistance which a PC resin inherently possesses may occasionally be lost due to the use of a phosphor-us-containing flame retardant. The thermal resistance of a resin composition is influenced by various factors, such as the properties of the flame retardant itself (e.g., thermal properties and viscosity of the flame retardant, and compatibility of the flame retardant with the resin), the ratio of the flame retardant to the resin, and the ratio of PC in the resin composition. Among these properties, the physical properties of the flame retardant used is especially important for the thermal resistance of a resin composition. Therefore, there has been a strong demand for the development of a phosphorus-containing flame retardant which does not adversely influence the thermal resistance of a PC resin.

Further, when a phosphoric ester having a low resistance to hydrolysis is used as a phosphorus-containing flame retardant for producing a PC/ABS/phosphorus-containing flame retardant composition, an ultimate molded article obtained from the resin composition suffers marked deterioration in mechanical properties. Particularly, the elongation and impact resistance of the molded article become lowered. Such a deterioration of the mechanical properties becomes significant when the molded article is placed under high temperature and high humidity conditions, and the molded article may occasionally be unable to maintain the mechanical properties which are necessary for, for example, housings of various machines. Further, it is generally difficult to reuse a material which has once undergone a marked deterioration. The above-mentioned disadvantages are likely to lead to serious problems, such as a loss of quality during a long term usage of the final product and a loss of recyclability of the final product, and therefore, there is a strong demand for techniques useful for overcoming these disadvantages.

Further, a PC/ABS/phosphorus-containing flame retardant composition prepared using a phosphorus-containing flame retardant has the following problem. When such a resin composition is subjected to molding, the phosphorus-containing flame retardant in the resin composition is likely to deposit on the surface of the mold. Such a phenomenon is called a mold deposit (MD) and the occurrence of MD is likely to lower the level of surface appearance and productivity of the molded articles. The use of a phosphoric ester oligomer-containing flame retardant tends to suppress the occurrence of MD, as compared to the use of a monophosphoric ester (such as triphenyl phosphate). However, the suppression of MD by the use of a conventional phosphoric ester oligomer-containing flame retardant is still unsatisfactory, and a further improvement has been desired.

As is apparent from the above, there has been a strong demand for a flame retardant polycarbonate resin composition which not only simultaneously exhibits excellent melt fluidity, impact resistance, thermal resistance and flame retardancy, but also has high stability in mechanical properties, and in which the amount of mold deposit generated during the molding of the resin composition is very small. However, it has conventionally been impossible to produce a flame retardant polycarbonate resin composition which exhibits all of the above-mentioned properties at a satisfactory level. The development of such an excellent flame retardant polycarbonate resin composition has therefore been desired.

SUMMARY OF THE INVENTION

In this situation, the present inventors have made extensive and intensive studies toward developing the above-mentioned excellent flame retardant polycarbonate resin composition. As a result, it has unexpectedly been found that a flame retardant polycarbonate resin composition comprising, in a specific ratio, an aromatic polycarbonate (A), a copolymer (B) comprising an aromatic vinyl monomer unit (b-1) and a vinyl cyanide monomer unit (b-2), a cyanide-containing, graft copolymer (C) obtained by copolymerizing an aromatic vinyl compound (c-1) and a vinyl cyanide compound (c-2) in the presence of a rubbery polymer (c-3), a (meth)acrylate-containing, graft copolymer (D) obtained by copolymerizing an aromatic vinyl compound (d-1) and an alkyl (meth)acrylate (d-2) in the presence of a rubbery butadiene polymer (d-3), and at least one organic phosphorus compound oligomer (E), not only simultaneously exhibits excellent flame retardancy, melt fluidity and impact resistance, but also has high stability in mechanical properties. Further, the present inventors found that the occurrence of mold deposit (MD) during the molding of such a resin composition is very small. The present invention has been completed, based on these novel findings.

Accordingly, it is a primary object of the present invention to provide a flame retardant polycarbonate resin composition which not only simultaneously exhibits excellent flame retardancy, melt fluidity, impact resistance and thermal resistance, but also has high stability in mechanical properties, and in which the occurrence of MD during the molding of the resin composition is very small.

The foregoing and other objects, features and advantages of the present invention will be apparent from the following detailed description and appended claims taken in connection with the accompanying drawings.

DETAILED DESCRIPTION OF THE INVENTION

Figure 1:
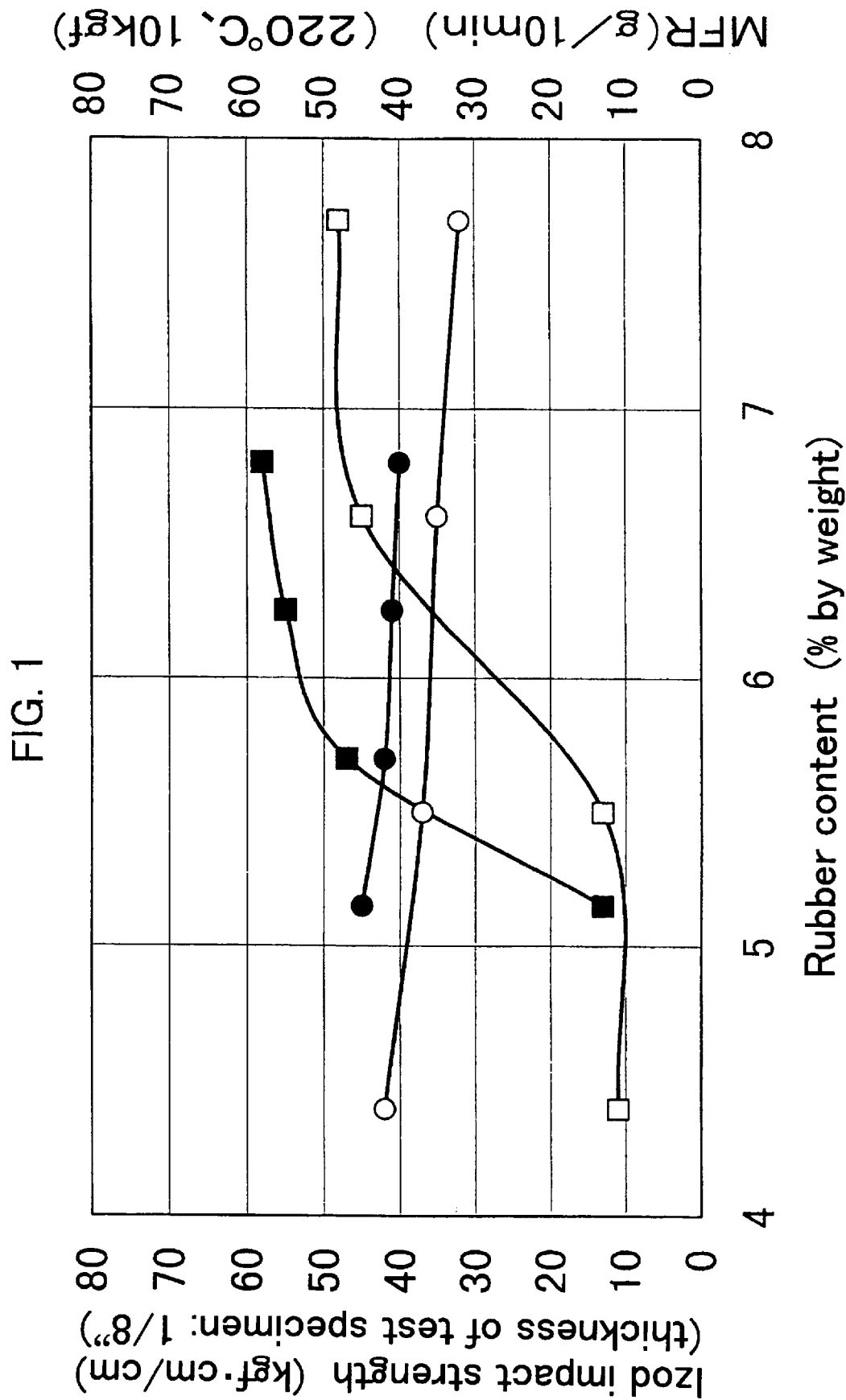
FIG. 1 is a graph showing the relationship between the rubber content and the Izod impact strength with respect to the resin compositions separately produced in Examples 9 to 12 and Comparative Examples 4 to 7 of the present application, together with the relationship between the rubber content and the melt flow rate (MFR) with respect to the resin compositions, wherein, in FIG. 1, ■ represents the Izod impact strength with respect to the resin compositions obtained in Examples 9 through 12; ● represents the MFR with respect to the resin compositions obtained in Examples 9 through 12; □ represents the Izod impact strength with respect to the resin compositions obtained in Comparative Examples 4 through 7; and ○ represents the MFR with respect to the resin compositions obtained in Comparative Examples 4 through 7.

In one aspect of the present invention, there is provided a flame retardant polycarbonate resin composition comprising:

50 to 98 parts by weight of an aromatic polycarbonate (A), 0.1 to 49 parts by weight of a copolymer (B) comprising an aromatic vinyl monomer unit (b-1) and a vinyl cyanide monomer unit (b-2), 0.5 to 30 parts by weight of a cyanide-containing, graft copolymer (C) obtained by copolymerizing an aromatic vinyl compound (c-1) and a vinyl cyanide compound (c-2) in the presence of a rubbery polymer (c-3), 0.5 to 30 parts by weight of a (meth)acrylate-containing, graft copolymer (D) obtained by copolymerizing an aromatic vinyl compound (d-1) and an alkyl (meth) acrylate (d-2) in the presence of a rubbery butadiene polymer (d-3), and 0.1 to 30 parts by weight of at least one organic phosphorus compound oligomer (E), wherein the total amount of the components (A), (B), (C) and (D) is 100 parts by weight.

For easy understanding of the present invention, the essential features and various embodiments of the present invention are enumerated below.

1. A flame retardant polycarbonate resin composition comprising:

50 to 98 parts by weight of an aromatic polycarbonate (A), 0.1 to 49 parts by weight of a copolymer (B) comprising an aromatic vinyl monomer unit (b-1) and a vinyl cyanide monomer unit (b-2), 0.5 to 30 parts by weight of a cyanide-containing, graft copolymer (C) obtained by copolymerizing an aromatic vinyl compound (c-1) and a vinyl cyanide compound (c-2) in the presence of a rubbery polymer (c-3), 0.5 to 30 parts by weight of a (meth)acrylate-containing, graft copolymer (D) obtained by copolymerizing an aromatic vinyl compound (d-1) and an alkyl (meth) acrylate (d-2) in the presence of a rubbery butadiene polymer (d-3), and 0.1 to 30 parts by weight of at least one organic phosphorus compound oligomer (E), wherein the total amount of the components (A), (B), (C) and (D) is 100 parts by weight.

2. The polycarbonate resin composition according to item 1 above, wherein the organic phosphorus compound oligomer (E) is selected from the group consisting of compounds represented by the following formula:

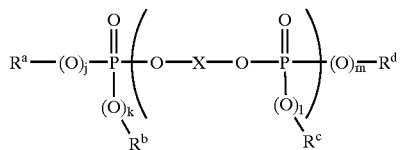

(1)

wherein:

X represents

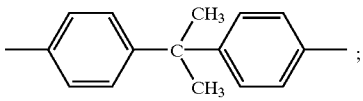

each of $R^a$, $R^b$, $R^c$ and $R^d$ independently represents a $C_6$–$C_{20}$ aryl group;

n represents an integer of 1 to 5; and each of j, k, l and m independently represents 0 or 1.

3. The polycarbonate resin composition according to item 2 above, wherein each of $R^a$, $R^b$, $R^c$ and $R^d$ in formula (1) independently represents a phenyl group or a xylyl group, with the proviso that each of the compounds of formula (1) contains at least one phenyl group and at least one xylyl group.

4. The polycarbonate resin composition according to any one of items 1 to 3 above, wherein the content of the rubbery butadiene polymer in the (meth)acrylate-containing, graft copolymer (D) is 65 to 95% by weight, and the weight ratio of the component (d-1) to the component (d-2) in the (meth)acrylate-containing, graft copolymer (D) is within the range of from 80/20 to 5/95.

5. The polycarbonate resin composition according to any one of items 1 to 4 above, wherein the aromatic polycarbonate (A) has a weight average molecular weight of from 15,000 to 30,000, and the copolymer (B) has a weight average molecular weight of from 50,000 to 180,000.

6. The polycarbonate resin composition according to any one of items 1 to 5 above, wherein the component (E) comprises a plurality of different organic phosphorus compound oligomers, wherein the weight average polymerization degree (N) of the plurality of different organic phosphorus compound oligomers (E) is in the range of from 1.0 to less than 1.2.

7. The polycarbonate composition according to any one of items 1 to 6 above, wherein the component (E) has an acid value of less than 1 mg KOH/g.

8. The polycarbonate resin composition according to item 7 above, wherein the component (E) has an acid value of less than 0.1 mg KOH/g. 9. The polycarbonate resin composition according to any one of items 1 to 8 above, which further comprises a tetrafluoroethylene polymer.

The present invention will now be described in detail.

The aromatic polycarbonate (A) used in the flame retardant polycarbonate resin composition of the present invention comprises recurring units each independently represented by the following formula (2):

(2)

wherein Ar represents a divalent aromatic group having 5 to 200 carbon atoms.

Examples of divalent aromatic groups Ar include a phenylene group, a naphthylene group, a biphenylene group and a pyridylene group, which are unsubstituted or substituted with at least one substituent as described below, and include a group represented by the following formula (3):

—Ar¹—Y—Ar²— (3)

wherein each of $Ar^1$ and $Ar^2$ independently represents an arylene group, such as a phenylene group, a naphthylene group, a biphenylene group or a pyridylene group, which is unsubstituted or substituted with at least one substituent as described below, and Y represents an unsubstituted or substituted alkylene group represented by any one of the following formulae (4):

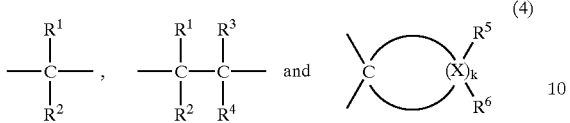
(4)

wherein each of $R^1$, $R^2$, $R^3$ and $R^4$ independently represents a hydrogen atom, a lower alkyl group having 1 to 6 carbon atoms, a cycloalkyl group having 5 to 10 carbon atoms, an aryl group having 6 to 30 carbon atoms or an aralkyl group having 7 to 31 carbon atoms, which may be substituted with a halogen atom or an alkoxy group having 1 to 10 carbon atoms; k represents an integer of from 3 to 11; each X represents a carbon atom and has $R^5$ and $R^6$ bonded thereto; each $R^5$ independently represents a hydrogen atom, a lower alkyl group having 1 to 6 carbon atoms or an aryl group having 6 to 30 carbon atoms, and each $R^6$ independently represents a hydrogen atom, a lower alkyl group having 1 to 6 carbon atoms or an aryl group having 6 to 30 carbon atoms; and wherein each of $R^1$, $R^2$, $R^3$, $R^4$, $R^5$ and $R^6$ may be substituted with a halogen atom and/or an alkoxy group having 1 to 10 carbon atoms.

The aromatic polycarbonate used in the present invention may contain, as a comonomer unit, a divalent aromatic group represented by the following formula (5):

$$—Ar^1—Z—Ar^2—  \quad (5)$$

wherein $Ar^1$ and $Ar^2$ are as defined in formula (3) above; and Z represents a single bond, or a divalent group, such as —O—, —CO—, —S—, —SO$_2$—, —CO$_2$—, or —CON(R$^1$)—, wherein $R^1$ is as defined in formula (4) above.

Specific examples of divalent aromatic groups represented by Ar of formula (2) and formula (5) usable in the present invention include groups respectively represented by the following formulae:

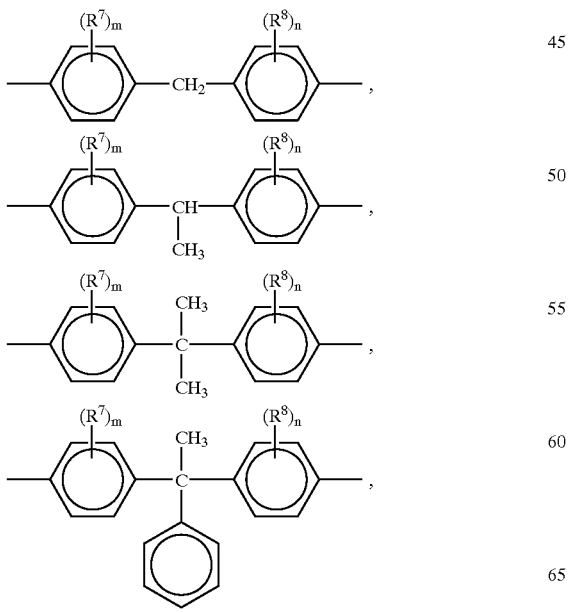

-continued

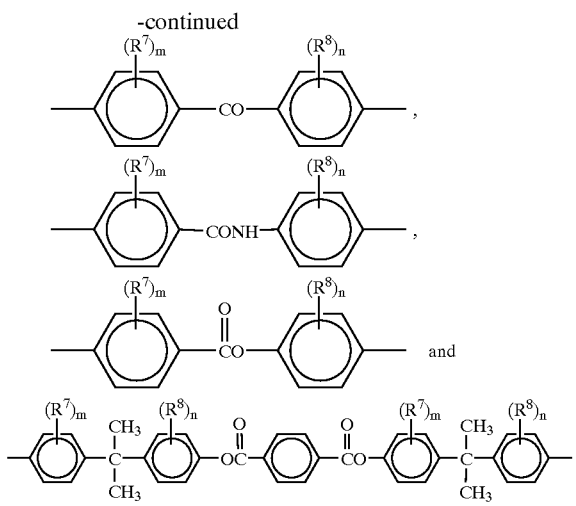

and wherein each of $R^7$ and $R^8$ independently represents a hydrogen atom, a halogen atom, an alkyl group having 1 to 10 carbon atoms, an alkoxy group having 1 to 10 carbon atoms, a cycloalkyl group having 5 to 10 carbon atoms, or an aryl group having 6 to 30 carbon atoms; each of m and n independently represents an integer of from 1 to 4, with the proviso that when m is an integer of from 2 to 4, the $R^7$'s are the same or different, and when n is an integer of from 2 to 4, the $R^8$'s are the same or different.

A preferred example of divalent aromatic groups is a group represented by the following formula (6):

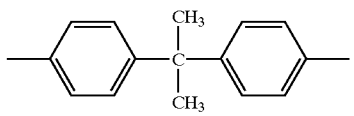

(6)

It is especially preferred that the polycarbonate contain 85 mole % or more, based on all of the monomer units in the polycarbonate, of recurring units each having an Ar represented by the above formula (6).

The polycarbonate used in the present invention may contain, as a comonomer unit, a tri- or more valent aromatic group having 6 to 300 carbon atoms.

With respect to the molecular structures of the terminal groups of the polycarbonate, there is no particular limitation. The terminal groups of the polycarbonate may be at least one member selected from the group consisting of a phenolic group, an aryl carbonate group and an alkyl carbonate group. A terminal aryl carbonate group is represented by the following formula (7):

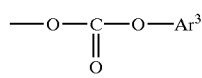

(7)

wherein $Ar^3$ represents a monovalent aromatic group having 6 to 30 carbon atoms, wherein the aromatic ring of $Ar^3$ may be unsubstituted or substituted.

Specific examples of terminal aryl carbonate groups include groups respectively represented by the following formulae:

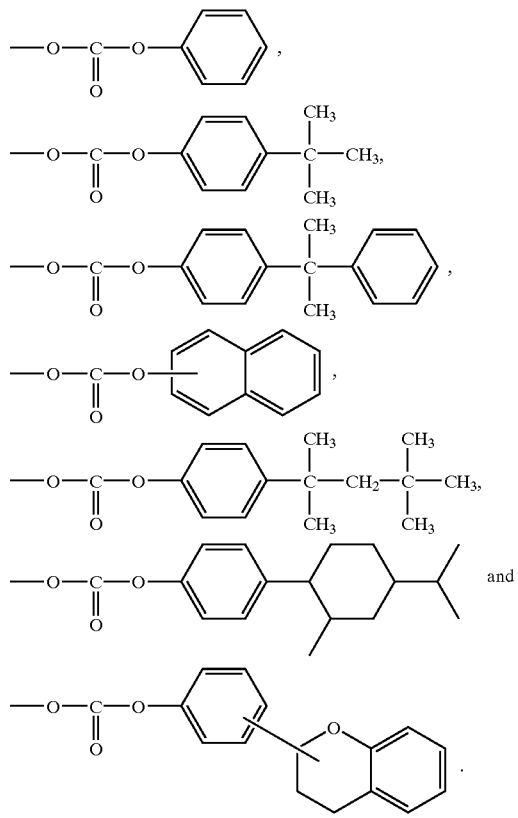

A terminal alkyl carbonate group is represented by the following formula (8):

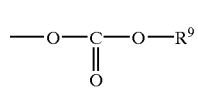

(8)

wherein $R^9$ represents a straight chain or branched alkyl group having 1 to 20 carbon atoms.

Specific examples of terminal alkyl carbonate groups include groups respectively represented by the following formulae:

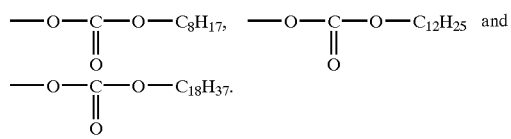

Among these terminal groups, preferred terminal groups are a phenolic group, a phenyl carbonate group, a p-t-butylphenyl carbonate group and a p-cumylphenyl carbonate group.

With respect to the ratio of the terminal phenolic groups to the other terminal groups, there is no particular limitation. However, from the viewpoint of improving melt fluidity, it is preferred that the amount of the terminal phenolic groups is 20% or more, more advantageously from 20 to 80%, based on the number of all terminal groups. When the amount of the terminal phenolic groups is more than 80%, the melt stability of the aromatic polycarbonate tends to slightly decrease.

As methods for determining the amount of the terminal phenolic groups, there are generally known a method using NMR (NMR method), a method using titanium (titanium method) and a method using UV or IR (UV method or IR method).

With respect to the aromatic polycarbonate (A) used in the present invention, it is generally preferred that the weight average molecular weight (Mw) of the aromatic polycarbonate is from 5,000 to 50,000, more preferably from 10,000 to 40,000, even more preferably from 15,000 to 30,000, and most preferably from 18,000 to 25,000. When the Mw of the aromatic polycarbonate is less than 5,000, the impact resistance of the resin composition tends to be unsatisfactory, and when the Mw of the polycarbonate is more than 50,000, the melt fluidity of the resin composition tends to be unsatisfactory.

In the present invention, the weight average molecular weight (Mw) of the polycarbonate is measured by gel permeation chromatography (GPC) under the following conditions. A calibration curve is obtained with respect to standard monodisperse polystyrenes using a polystyrene gel column and tetrahydrofuran as a solvent. The obtained calibration curve is modified by a calculation using the following formula:

$$M_{PC}=0.3591M_{PS}1.0388$$

wherein $M_{PC}$ represents the molecular weight of a polycarbonate and $M_{PS}$ represents the molecular weight of a polystyrene, thereby obtaining a modified calibration curve for a polycarbonate. The weight average molecular weight of a polycarbonate is measured by GPC using the obtained modified calibration curve.

The polycarbonate (A) used in the present invention can be produced by a conventional method. Examples of conventional methods include an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent; a transesterification process (melt process) in which an aromatic dihydroxy compound and a carbonic diester (e.g., a diphenyl carbonate) are reacted with each other; a solid state polymerization process in which a carbonate prepolymer obtained by the phosgene process or by the melt process is crystallized and subjected to a solid state polymerization (Unexamined Japanese Patent Application Laid-Open Specification No. 1-158033 (corresponding to U.S. Pat. No. 4,948,871)); a method disclosed in Unexamined Japanese Patent Application Laid-Open Specification No. 1-271426; and a method disclosed in Unexamined Japanese Patent Application Laid-Open Specification No. 3-68627 (corresponding to U.S. Pat. No. 5,204,377).

As a polycarbonate resin preferably used in the present invention, there can be mentioned a polycarbonate resin produced from a divalent phenol (aromatic dihydroxy compound) and a carbonic diester by a transesterification process. Such a polycarbonate resin advantageously contains substantially no chlorine atoms.

In the present invention, as component (A), two or more different polycarbonates having different structures and/or molecular weights can be used in combination.

In the flame retardant polycarbonate resin composition of the present invention, the amount of the component (A) is 50 to 98 parts by weight, preferably 60 to 95 parts by weight, more preferably 70 to 90 parts by weight, relative to 100 parts by weight of the total amount of the components (A), (B), (C) and (D). When the amount of component (A) is less than 50 parts by weight, both of the thermal resistance and flame retardancy of the resin composition become unsatisfactory. On the other hand, when the amount of component (A) is more than 98 parts by weight, the melt fluidity of the resin composition becomes unsatisfactory.

The copolymer (B) of the resin composition of the present invention comprises an aromatic vinyl monomer unit (b-1) and a vinyl cyanide monomer unit (b-2). The component (B) is used for the purpose of improving the melt fluidity of the resin composition.

Examples of aromatic vinyl monomers which can be used for forming the aromatic vinyl monomer unit (b-1) in the copolymer (B) include styrene, α-methylstyrene, para-methylstyrene, vinylxylene, para-tert-butylstyrene, ethylstyrene and vinylnaphthalene. These compounds can be used individually or in combination. Among these aromatic vinyl monomers, preferred monomers are styrene and α-methylstyrene.

Examples of monomers which can be used for forming the vinyl cyanide monomer unit (b-2) include acrylonitrile and methacrylonitrile. These compounds can be used individually or in combination.

The weight average molecular weight of the copolymer (B) is generally from 30,000 to 300,000, preferably from 80,000 to 200,000, more preferably from 100,000 to 180,000, most preferably from 120,000 to 150,000.

There is no particular limitation with respect to the ratio of the monomer unit (b-1) to the monomer unit (b-2), namely the (b-1)/(b-2) ratio. It is preferred that the aromatic vinyl monomer unit (b-1) content of the component (B) is from 95 to 50% by weight and the vinyl cyanide monomer unit (b-2) content of the component (B) is from 5 to 50% by weight. It is more preferred that the monomer unit (b-1) content of the component (B) is from 92 to 65% by weight and the monomer unit (b-2) content of the compound (B) is from 8 to 35% by weight.

In addition, as long as the excellent effects of the present invention are obtained, the component (B) may comprise other monomers which are copolymerizable with the above-mentioned components (b-1) and (b-2). Examples of such monomers include alkyl (meth)acrylates, such as methyl (meth)acrylate, ethyl (meth)acrylate, propyl (meth)acrylate, butyl meth(acrylate), 2-ethyl (meth)acrylate, 2-ethylhexyl methacrylate (among these alkyl (meth)acrylates, butyl methacrylate is preferred); (meth)acrylic acids, such as acrylic acid and methacrylic acid; α,β-unsaturated carboxylic acids, such as maleic anhydride; maleimide compounds, such as N-phenylmaleimide, N-methylmaleimide and N-cyclohexylmaleimide; and glycidyl group-containing monomers, such as glycidyl methacrylate. These monomers can be used individually or in combination.

Preferred examples of component (B) include a styrene-acrylonitrile copolymer resin (SAN) and a butyl acrylate-acrylonitrile-styrene copolymer resin (BAAS). Among these resins, a BAAS can be advantageously used for improving the melt fluidity of the resin composition. It is preferred that the BAAS contains a butyl acrylate monomer in an amount of from 2 to 20% by weight, based on the weight of the BAAS.

For producing the component (B), there can be employed conventional polymerization methods, such as a bulk polymerization method, a solution polymerization method, a suspension polymerization method and an emulsion polymerization method.

In the resin composition of the present invention, the component (B) is used in an amount of from 0.1 to 49 parts by weight, preferably from 1 to 30 parts by weight, more preferably from 3 to 20 parts by weight, relative to 100 parts by weight of the total amount of the components (A), (B), (C) and (D). When the amount of the component (B) is less than 0.1 part by weight, the melt fluidity of the resin composition becomes unsatisfactory. On the other hand, when the amount of the component (B) exceeds 49 parts by weight, the heat resistance and flame retardancy of the resin composition become unsatisfactory.

In the present invention, two or more different copolymers having different structures and/or molecular weights can be used in combination as the component (B).

The component (C) of the resin composition of the present invention is a cyanide-containing, graft copolymer which is obtained by copolymerizing an aromatic vinyl compound (c-1) and a vinyl cyanide compound (c-2) in the presence of a rubbery polymer (c-3). As the aromatic vinyl compound (c-1) and the vinyl cyanide compound (c-2), the same aromatic vinyl compounds and vinyl cyanide compounds as used for producing the component (B) can be used, respectively.

With respect to the rubbery polymer used as the component (c-3), it is preferred that the rubbery polymer has a glass transition temperature of 0° C. or lower, more preferably −10° C. or lower, most preferably −30° C. or lower.

Specific examples of rubbery polymers used as the component (c-3) include diene rubbers, such as polybutadiene, a styrene-butadiene copolymer, an acrylonitrile-butadiene copolymer; acrylic rubbers, such as poly(butyl acrylate); polyisoprene; polychloroprene; ethylene-propylene rubbers; ethylene-propylene-diene ternary copolymer rubbers; block copolymers, such as a styrene-butadiene block copolymer and a styrene-isoprene block copolymer; and hydrogenation products of the above-mentioned polymers. Among these polymers, preferred are polybutadiene, a styrene-butadiene copolymer rubber, an acrylonitrile-butadiene copolymer rubber and poly(butyl acrylate).

The cyanide-containing, graft copolymer (C) can be produced by graft polymerizing aromatic vinyl compound (c-1) and vinyl cyanide compound (c-2) onto the above-mentioned rubbery polymer (c-3). If desired, one or more compounds selected from the group consisting of (meth) acrylic acids, such as acrylic acid and methacrylic acid; alkyl (meth)acrylates, such as methyl (meth)acrylate, ethyl (meth) acrylate, propyl (meth)acrylate, butyl meth(acrylate), 2-ethyl (meth)acrylate and 2-ethylhexyl methacrylate; α,β-unsaturated carboxylic acids, such as maleic anhydride; maleimide compounds, such as N-phenylmaleimide, N-methylmaleimide and N-cyclohexylmaleimide; and glycidyl group-containing monomers, such as glycidyl methacrylate, can also be graft polymerized onto the rubbery polymer (c-3). The component (C) can be produced by a graft polymerization, for example by employing an emulsion polymerization method, a bulk polymerization method, a suspension polymerization method, a bulk-suspension polymerization method and a solution polymerization method. Among these methods, an emulsion polymerization method is especially preferred.

In the cyanide-containing, graft copolymer (C), the content of the rubbery polymer (c-3) is generally in the range of from 10 to 85% by weight, preferably from 30 to 82% by weight, more preferably from 40 to 80% by weight. When the amount of the rubbery polymer (c-3) is less than 10% by weight, the improvement in impact resistance of the resin composition tends to be lowered. On the other hand, when the amount of the rubbery polymer (c-3) exceeds 85% by weight, the dispersibility of the component (C) in the resin composition tends to become unsatisfactory. When a butadiene polymer is used as the rubbery polymer (c-3), it is preferred that the butadiene polymer has a butadiene content of 50% by weight or more.

There is no particular limitation with respect to the weight ratio of the component (c-1) to the component (c-2), namely the (c-1)/(c-2) ratio, and the (c-1)/(c-2) ratio can be selected depending on the utility of the final resin composition. In general, the (c-1)/(c-2) ratio is in the range of from 90/10 to 60/40, preferably from 85/15 to 65/35, more preferably from 80/20 to 70/30.

The most preferred cyanide-containing, graft copolymer (C) to be used in the present invention is a particulate graft copolymer obtained by emulsion polymerization. It is preferred that the particulate graft copolymer has an average particle diameter of from 0.1 to 1.5 μm, more preferably from 0.15 to 0.8 μm, even more preferably from 0.2 to 0.6 μm, and most preferably from 0.25 to 0.4 μm. When the average particle diameter of the graft copolymer is less than 0.1 μm, the impact resistance of the resin composition tends to be lowered. When the average particle diameter of the graft copolymer exceeds 1.5 μm, the appearance of an ultimate shaped article obtained from the resin composition tends to become poor.

Specific examples of cyanide-containing graft copolymers (C) which are preferably used in the present invention include an acrylonitrile-butadiene-styrene copolymer (ABS), an acrylonitrile-ethylene-propylene-styrene copolymer (AES), an acrylonitrile-chlorinated polyethylene-styrene copolymer (ACS) and an acrylonitrile-acrylic elastic polymer-styrene copolymer (AAS).

In the resin composition of the present invention, the above-mentioned cyanide-containing graft copolymers to be used as the component (C) can be used individually or in combination of two or more different copolymers having different particle diameters and/or structures.

In the resin composition of the present invention, the component (C) is used in an amount of from 0.5 to 30 parts by weight, preferably from 1 to 20 parts by weight, more preferably from 3 to 15 parts by weight, relative to 100 parts by weight of the total amount of the components (A), (B), (C) and (D). When the amount of the component (C) is less than 0.5 part by weight, the improvement in impact resistance of the final resin composition becomes unsatisfactory. When the amount of the component (C) is more than 30 parts by weight, the melt fluidity and rigidity of the resin composition become unsatisfactory.

The component (D) used in the present invention is a (meth)acrylate-containing, graft copolymer which is obtained by copolymerizing an aromatic vinyl compound (d-1) and an alkyl (meth)acrylate (d-2) in the presence of a rubbery butadiene polymer (d-3). In the present invention, the (meth)acrylate-containing, graft copolymer (D) is an essential component for improving both the melt fluidity and the impact resistance of the resin composition. The polycarbonate resin composition of the present invention which comprises not only a cyanide-containing, graft copolymer (C), but also a (meth)acrylate-containing, graft copolymer as a graft rubber component, exhibits less yellowing as compared to a resin composition comprising only the component (C) as a graft rubber component. The advantageously low level of yellowing of the resin composition of the present invention leads to an improvement in tinting by a dye or a pigment. Furthermore, the weld strength of the resin composition can be improved by the use of the (meth)acrylate-containing, graft copolymer (D).

As an aromatic vinyl compound (d-1), the same aromatic vinyl compounds as used for producing the component (B) can be used.

Specific examples of an alkyl (meth)acrylate (d-2) include methyl (meth)acrylate, ethyl (meth)acrylate, propyl (meth)

acrylate, butyl (meth)acrylate, 2-ethyl (meth)acrylate and 2-ethylhexyl methacrylate.

It is preferred that the rubbery butadiene polymer (d-3) has a butadiene content of 50% by weight or more. It is also preferred that the rubbery butadiene polymer (d-3) has a glass transition temperature of −20° C. or lower, more preferably −30° C. or lower, most preferably −50° C. or lower. The component (d-3) may be a butadiene homopolymer (polybutadiene) or a butadiene copolymer obtained by copolymerizing butadiene with a monomer or crosslinking agent which is copolymerizable with butadiene.

Preferred examples of such a rubbery butadiene polymer (d-3) include polybutadiene, a styrene-butadiene copolymer rubber, an acrylonitrile-butadiene copolymer rubber and a butadiene-butyl acrylate copolymer rubber. Among these polymers, polybutadiene and a styrene-butadiene copolymer rubber are especially preferred from the viewpoint of improvement in both the melt fluidity and the impact resistance of the resin composition.

The amount of the rubbery butadiene polymer (d-3) in the (meth)acrylate-containing, graft copolymer (D) is generally from 65 to 90% by weight, preferably from 70 to 85% by weight, more preferably from 75 to 83% by weight, based on the weight of the component (D). When the amount of the rubbery butadiene polymer (d-3) is less than 65% by weight, the improvement in impact resistance of the resin composition tends to be lowered. On the other hand, when the amount of the rubbery butadiene polymer (d-3) exceeds 90% by weight, the dispersibility of the component (D) in the resin composition tends to be lowered.

It is preferred that the weight ratio of the aromatic vinyl compound (d-1) to the alkyl (meth)acrylate (d-2) in the component (D), namely the (d-1)/(d-2) ratio, is in the range of from 80/20 to 5/95. When the (d-1)/(d-2) ratio is outside the above-mentioned range, the improvement in impact resistance of the resin composition becomes unsatisfactory. The (d1)/(d-2) ratio is more preferably in the range of from 60/40 to 10/90, most preferably from 50/50 to 20/80.

The (meth)acrylate-containing, graft copolymer (D) can be produced by graft polymerizing the aromatic vinyl compound (d-1) and the alkyl(meth)acrylate (d-2) onto the rubbery butadiene polymer (d-3). If desired, one or more compounds selected from the group consisting of a (meth) acrylic acid, such as acrylic acid and methacrylic acid; an α,β-unsaturated carboxylic acid, such as maleic anhydride; a maleimide compound, such as N-phenylmaleimide, N-methylmaleimide and N-cyclohexylmaleimide; and a glycidyl group-containing monomer, such as glycidyl methacrylate can be also graft polymerized onto the aromatic vinyl compound (d-1). The component (D) can be produced by a graft polymerization, for example by employing an emulsion polymerization method, a bulk polymerization method, a suspension polymerization method, a bulk-suspension polymerization method or a solution polymerization method. Among these methods, an emulsion polymerization method is especially preferred.

As examples of modes for producing the component (D) by emulsion polymerization, there can be mentioned the following modes (1) to (3):

(1) a mode in which the components (d-1) and (d-2) are simultaneously graft copolymerized onto rubbery butadiene polymer (d-3);

(2) a mode in which the component (d-1) is graft copolymerized onto the rubbery butadiene polymer (d-3), thereby obtaining a graft copolymer and, then, the component (d-2) is graft copolymerized onto the obtained graft copolymer; and (3) a mode in which the component (d-2) is graft copolymerized onto the rubbery butadiene polymer (d-3), thereby obtaining a graft polymer and, then, the component (d-1) is graft copolymerized onto the obtained graft copolymer.

In the present invention, the component (D) obtained by the above-mentioned mode (2) is especially preferred from the viewpoint of the improvement in both the melt fluidity and the impact resistance of the resin composition. Moreover, it is most preferred that methyl methacrylate is used as the component (d-2).

Figure 2:
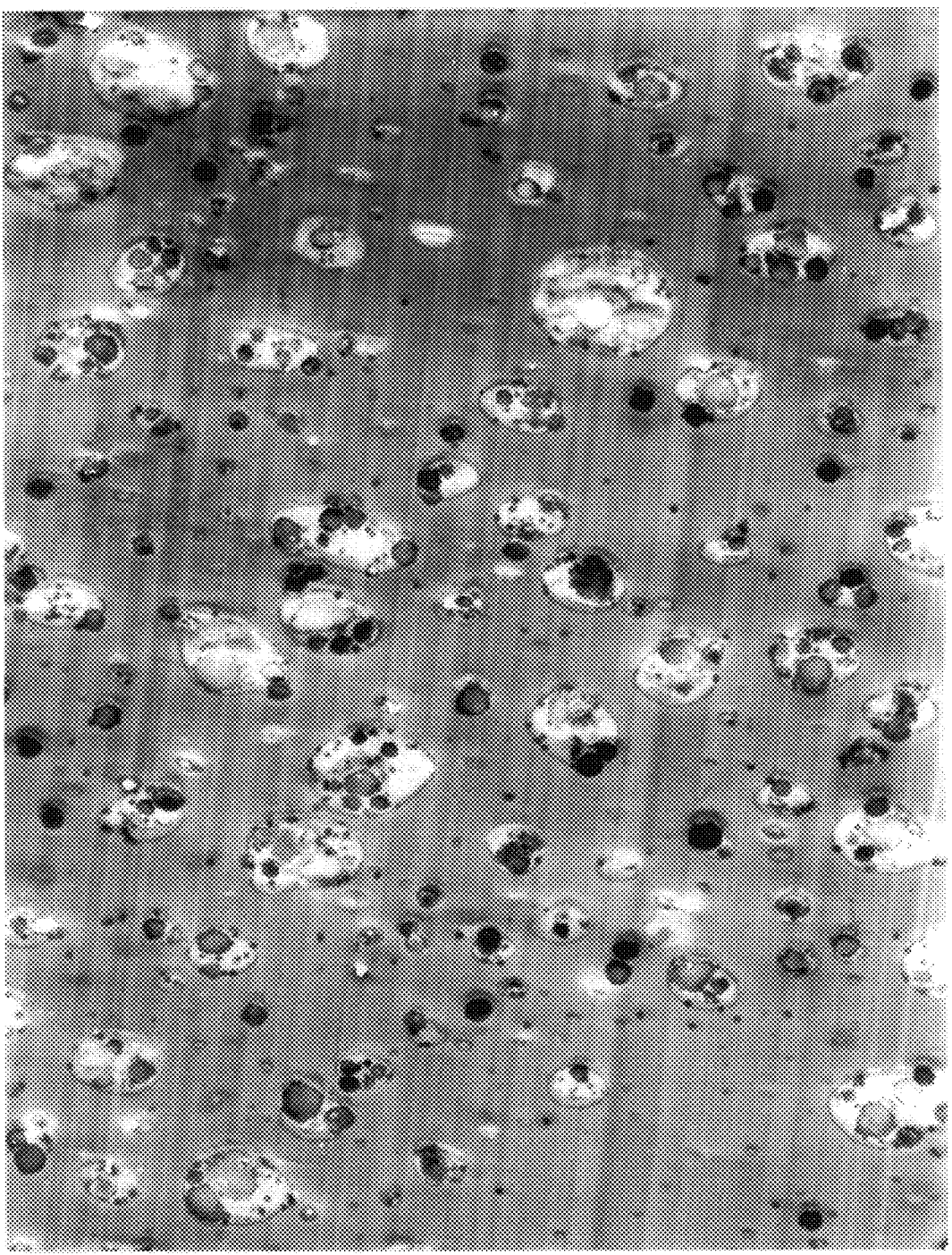
FIG. 2 is a TEM photomicrograph of the resin composition obtained in Example 4, wherein the TEM photomicrograph has been taken by means of a transmission electron microscope (TEM)
Figure 3:
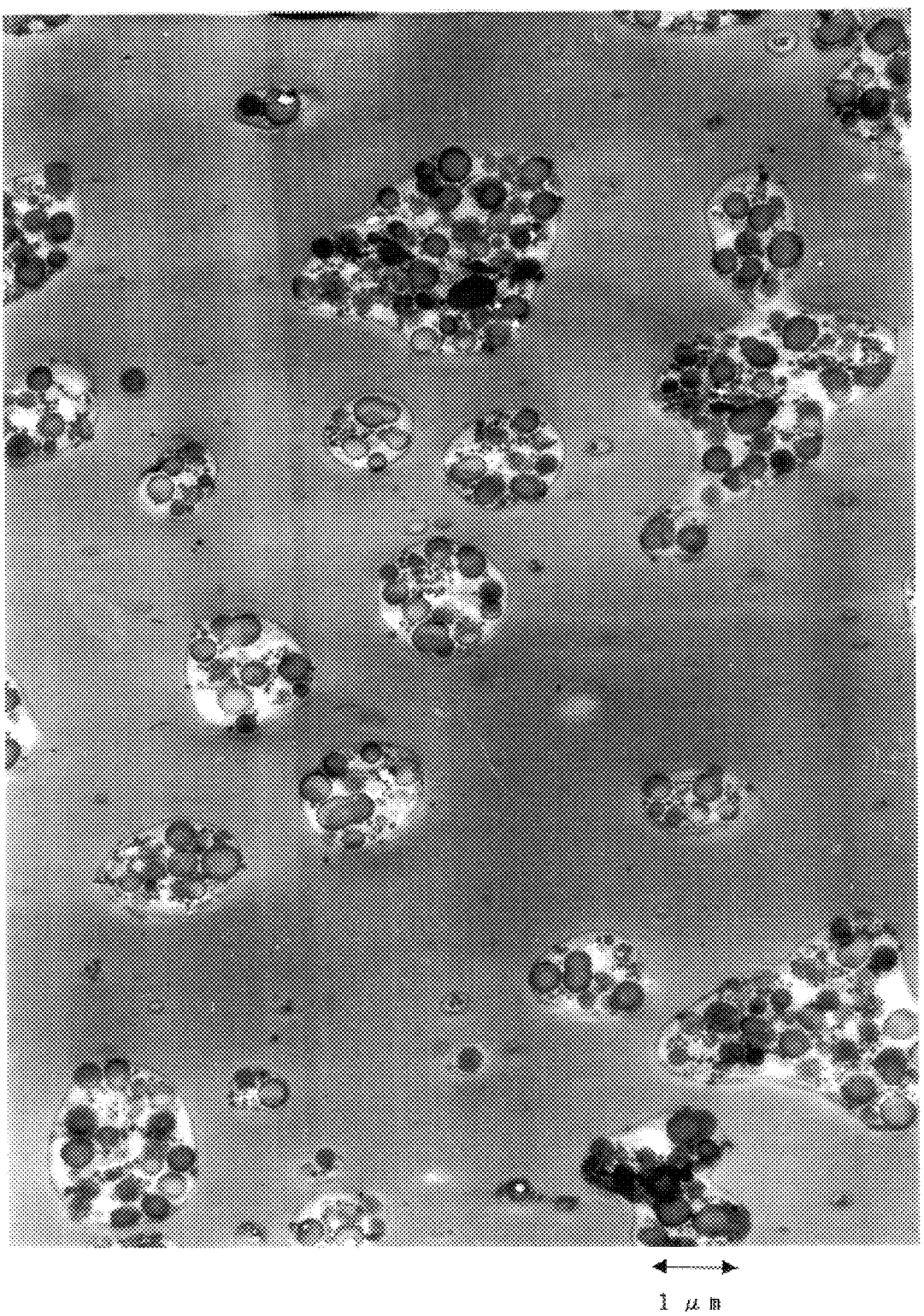
FIG. 3 is a TEM photomicrograph of the resin composition obtained in Comparative Example 2.

When the dispersion morphology of the resin composition of the present invention (which comprises the above-mentioned (meth)acrylate-containing, graft copolymer (D)) is observed under a transmission electron microscope (TEM), it was found that the (meth)acrylate-containing, graft copolymer (D) is present not only in the domains formed by the copolymer (B), but also in the aromatic polycarbonate resin (A) which constitutes the matrix of the resin composition (See FIG. 2 which is a TEM photomicrograph of the resin composition obtained in Example 4). On the other hand, a resin composition containing only the cyanide-containing, graft copolymer (C) as a graft rubber component has a dispersion morphology in which almost all of the component (C) is dispersed in the copolymer (B). Therefore, almost no rubber component is dispersed in the polycarbonate (See FIG. 3 which is a TEM photomicrograph of the resin composition obtained in Comparative Example 2). It is considered that such a dispersion morphology of the resin composition of the present invention greatly contributes to the excellent melt fluidity and excellent impact resistance of the resin composition.

In the present invention, it is preferred that the (meth) acrylate-containing, graft copolymer (D) is in a particulate form and has an average particle diameter of from 0.1 to 1.5 μm, more preferably from 0.15 to 0.8 μm, still more preferably 0.2 to 0.6 μm. A particulate (meth)acrylate-containing, graft copolymer (D) can be obtained by the above-mentioned emulsion polymerization method. When the average particle diameter of the component (D) is less than 0.1 μm, the impact resistance of the resin composition tends to be lowered. When the average particle diameter of the component (D) exceeds 1.5 μm, the appearance of an ultimate shaped article obtained from the resin composition tends to become poor.

In producing the (meth)acrylate-containing, graft copolymer (D) by emulsion polymerization, use is made of a polymer latex which contains component (d-3) in a particulate form. The component (d-3) may be either in the form of particles having a relatively large particle diameter (i.e., 0.05 to 1 μm) or in the form of grown grains which are obtained by coagulating the microparticles (i.e., particles having a primary particle diameter of from 0.01 to 0.15 μm). The component (d-3) may have a broad particle diameter distribution and it may be a mixture of those particles which have greatly differing particle diameters.

In general, when the component (D) is produced by emulsion polymerization, a solidification process is performed for separating the desired (meth)acrylate-containing, graft copolymer (D) from the polymer latex produced by a polymerization process. In the present invention, a (meth) acrylate-containing, graft copolymer obtained by a solidification process using an acid instead of a metal salt (such as aluminum sulfate, magnesium sulfate and calcium chloride) is preferred as the component (D).

Specific examples of the component (D) which are preferably used in the resin composition of the present invention include "Metablen C-223A" and "Metablen C-323A" (both manufactured and sold by Mitsubishi Rayon Co., Ltd., Japan),and "Kane Ace M-511" and "Kane Ace B-564" (both manufactured and sold by KANEKA CORP., Japan).

In the present invention, the above-mentioned (meth) acrylate-containing, graft copolymers can be used individually or in combination as the component (D). The amount of the component (D) is in the range of from 0.5 to 30 parts by weight, preferably from 1 to 20 parts by weight, more preferably from 3 to 15 parts by weight, relative to 100 parts by weight of the total amount of the components (A), (B), (C) and (D). When the amount of the component (D) is less than 0.5 part by weight, the improvement in impact resistance of the resin composition becomes unsatisfactory. When the amount of the component (D) exceeds 30 parts by weight, the melt fluidity and the rigidity of the resin composition become unsatisfactory.

There is no particular limitation with respect to the ratio of the component (C) to the component (D), namely the (C)/(D) ratio in the resin composition. However, it is preferred that the (C)/(D) ratio in terms of the weights of components (C) and (D) is in the range of from 90/10 to 40/60, more preferably from 85/15 to 50/50, still more preferably from 80/20 to 60/40. The total amount of the components (C) and (D) is from 1 to 40 parts by weight, preferably from 3 to 30 parts by weight, more preferably from 5 to 20 parts by weight, relative to 100 parts by weight of the total amount of the components (A), (B), (C) and (D).

The component (E) of the present invention is at least one organic phosphorus compound oligomer. The organic phosphorus compound oligomer which is used in the present invention is a compound containing two or more phosphorus atoms.

As an example of the component (E) used in the present invention, there can be mentioned a compound selected from the group consisting of compounds individually represented by the following formula:

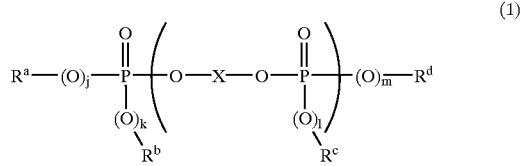

(1)

wherein:

X represents

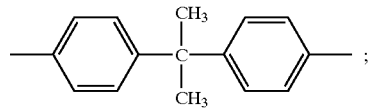

each of $R^a$, $R^b$, $R^c$ and $R^d$ independently represents a $C_6$–$C_{20}$ aryl group;

n represents an integer of 1 to 5; and each of j, k, l and m independently represents 0 or 1.

At least one hydrogen atom of each of the groups $R^a$, $R^b$, $R^c$ and $R^d$ in formula (1) above may be unsubstituted or independently substituted with a substituent. When at least one hydrogen atom is substituted by a substituent, examples of such substituents include an alkyl group, an alkoxy group, an alkylthio group, a halogen atom, an aryl group, an aryloxy group, an arylthio group and a halogenated aryl group, and a group obtained by combining the above-mentioned substituents (for example, an arylalkoxyalkyl group) and a group obtained by combining the above-mentioned substituents through an oxygen atom, a sulfur atom, a nitrogen atom and the like (for example, an arylsulfonyl-aryl group).

Examples of aryl groups $R^a$, $R^b$, $R^c$ and $R^d$ which are especially preferred in the present invention include a phenyl group, a cresyl group, a xylyl group, a propylphenyl group and a butylphenyl group. When each of the groups $R^a$, $R^b$, $R^c$ and $R^d$ in the compound represented by formula (1) is an alkyl group or an cycloalkyl group, the thermal stability of the compound is generally unsatisfactory and such a compound is likely to be decomposed during melt kneading.

As mentioned above, the X group in the above-mentioned formula (1) is a diphenyloldimethylmethane group. In most of the oligomeric phosphoric esters conventionally used in the art, the group corresponding to the X group in the above-mentioned formula is a resorcinol group or a hydroquinone group. Contrary to such an oligomeric phosphoric ester, the compound preferably used as the component (E) in the present invention, namely the compound represented by formula (1) (wherein X is a diphenyloldimethylmethane group), has improved hydrolysis resistance and thermal stability. Therefore, when a resin composition of the present invention is produced using such an organic phosphorus compound as component (E), the lowering of mechanical properties (especially the lowering of the mechanical properties under high temperature and high humidity conditions) of the produced resin composition is greatly suppressed. By virtue of such advantageous properties, the reliability of the resin composition becomes remarkably enhanced. Furthermore, by using the organic phosphorus compound represented by the above-mentioned formula (1), it becomes possible to reduce the amount of the mold deposit (MD) adhering to the surface of a mold during the molding of the resin composition to a remarkably low level, as compared to that of a resin composition containing a conventional oligomeric phosphoric ester.

In the present invention, it is especially preferred that each of the groups $R^a$, $R^b$, $R^c$ and $R^d$ in formula (1) independently represents a phenyl group or a xylyl group, with the proviso that each of the compounds of formula (1) contains at least one phenyl group and at least one xylyl group (such a compound is hereinafter, frequently referred to as "a compound of formula (1) comprising both a phenyl group and a xylyl group"). By the use of such an organic phosphorus compound (i.e., a compound of formula (1) comprising both a phenyl group and a xylyl group) as the component (E), the heat resistance of the resin composition can be further improved and the occurrence of MD can be reduced to a lower level. In the above-mentioned compound of formula (1) comprising both a phenyl group and a xylyl group, it is preferred that the ratio of the xylyl group to the phenyl group is in the range of from 1:1 to 1:3, for obtaining an excellent balance of flame retardancy, heat resistance, impact resistance and melt fluidity. As a xylyl group, a 2,6-xylyl group is especially preferred from the viewpoint of heat resistance and hydrolysis resistance. Contrary to a resin composition produced using a compound of formula (1) comprising both a phenyl group and a xylyl group, when a compound is used in which all of $R^a$, $R^b$, $R^c$ and $R^d$ in formula (1) are phenyl groups, the heat resistance of the resin composition tends to become slightly poor, and when a compound is used in which all of groups $R^a$, $R^b$, $R^c$ and $R^d$ in formula (1) are xylyl groups, the flame retardancy of the resin composition tends to become slightly poor. An organic phosphorus compound of formula (1) comprising both a phenyl group and a xylyl group can be produced by a method described in Unexamined Japanese Patent Application Laid-Open Specification No. 9-12587. A compound having a desired structure can be produced selectively and efficiently by that method.

The organic phosphorus compound oligomer (E) represented by formula (1) is frequently a mixture of a plurality of organic phosphorus compound oligomers having different n values in formula (1) (wherein n is a natural number). In the present invention, it is preferred that the weight average polymerization degree (N) of the plurality of organic phosphorus compound oligomers is in the range of from 1 to less than 1.2. The weight average polymerization degree N is determined as follows. First, the respective weight fractions of component compounds having different n values are determined by gel permeation chromatography or liquid chromatography. Then, the N value is calculated as the weight average of the different n values. The chromatography is conducted using a UV detector or an RI detector as a detector. When a compound represented by the above-mentioned formula (1) in which the n value is 0 (i.e., an organic phosphorus compound containing only one phosphorus atom in the molecule thereof) is used together with the component (E) represented by formula (1) above (in which n is 1 to 5), the compound having an n value of 0 is excluded from the calculation of the N value. The weight average polymerization degree N is generally in the range of from 1 to 5, preferably from 1 to 2, more preferably from 1 to 1.5, most preferably from 1 less than 1.2. The compatibility of the component (E) with the resin, and the melt fluidity and the flame retardancy of the final resin composition are improved as the N of the component (E) decreases. Especially, the resin composition containing a compound having an N value of 1 exhibits an excellent balance of flame retardancy and melt fluidity. A compound represented by formula (1) which has an N value of 5 or more has a high viscosity, and when such a compound is used as the component (E) of the resin composition, the melt fluidity of the resin composition tends to be lowered, especially in the region where a high shear rate is achieved. Also the flame retardancy of the resin composition tends to be lowered.

Further, with respect to the component (E) used in the present invention, it is preferred that the acid value is less than 1 mg KOH/g, more preferably less than 0.7 mg KOH/g, still more preferably less than 0.4 mg KOH/g, and an acid value of less than 0.1 mg KOH/g is especially preferred. From the studies made by the present inventors, it was found that the hydrolysis rate of an organic phosphorus compound depends greatly upon the temperature and the initial acid value of the organic phosphorus compound. Therefore, a resin composition having a high environmental deterioration resistance, that is, a resin composition which is free from a lowering in physical properties under high temperature and high humidity conditions, a lowering in physical properties during the molding process (such as repeated compounding and injection molding) and the like, can be obtained by using an organic phosphorus compound having a low initial acid value as a flame retardant.

The amount of the organic phosphorus compound oligomer (E) contained in the resin composition is chosen depending on the desired level of flame retardancy, but it is generally used in the range of from 0.1 to 30 parts by weight, relative to 100 parts by weight of the total of the components (A), (B), (C) and (D). When the amount of the component (E) is less than 0.1 part by weight, the flame retardancy becomes unsatisfactory. When the amount of the component (E) exceeds 30 parts by weight, the impact resistance and heat resistance of the resin composition become lowered. The amount of the component (E) is preferably in the range of from 0.5 to 20 parts by weight, most preferably from 5 to 18 parts by weight.

It is preferred that an anti-dripping agent is used together with the component (E). Examples of anti-dripping agents include a tetrafluoroethylene polymer, such as polytetrafluoroethylene and a tetrafluoroethylenepropylene copolymer; a perfluoroalkane polymer other than a tetrafluoroethylene; a silicone rubber; a polycarbonatediorganosiloxane copolymer; siloxanepolyetherimide; a liquid crystal polymer; and a silicone-acrylic rubber. As an anti-dripping agent, preferred is a tetrafluoroethylene polymer and most preferred is polytetrafluoroethylene. The tetrafluoroethylene polymer is produced by suspension polymerization or emulsion polymerization as described, for example, in "Fusso Jushi Hando Bukku (Fluororesin Handbook)", published in 1990 by the Nikkan Kogyo Shimbun Ltd., Japan). It is preferred that the amount of the anti-dripping agent is from 0.01 to 3 parts by weight, more preferably from 0.05 to 2 parts by weight, relative to 100 parts by weight of the total of the components (A), (B), (C) and (D). When the amount of the anti-dripping agent is less than 0.01 part by weight, the dripping-preventive effect becomes unsatisfactory and high flame retardancy cannot be obtained. When the amount of the anti-dripping agent exceeds 3 parts by weight, the moldability and rigidity of the resin composition are lowered.

Further, flame retardants other than the component (E) can be used together with the component (E) in amounts which are generally used in various conventional aromatic polycarbonate resin compositions. Examples of flame retardants other than the component (E) include nitrogen-containing organic compounds, such as a melamine; inorganic compounds, such as magnesium hydroxide and aluminum hydroxide; metal oxides, such as antimony oxide, bismuth oxide, zinc oxide and tin oxide; red phosphorus; inorganic phosphorus compounds, such as phosphine, hydrophosphorous acid, phosphorous acid, metaphosphoric acid, pyrophosphoric acid and phosphoric anhydride; expanded graphite; silica; and fused silica glass.

In order to modify the properties of the resin composition, inorganic fillers, such as glass fibers, glass flakes, glass beads, calcium carbonate, talc and mica; and reinforcements, such as carbon fibers, and charcoal, can be added to the resin composition. The fillers and the reinforcements are preferably used in amounts of from 0.01 to 60 parts by weight, more preferably from 5 to 55 parts by weight, relative to 100 parts by weight of the total of the components (A), (B), (C) and (D).

Further, if desired, conventional additives may be used, such as a heat stabilizer, an antioxidant, a lubricant, an antistatic agent, an ultraviolet absorber, a colorant, titanium oxide, a surface modifier, a dispersant and a plasticizer. As a heat stabilizer, there can be mentioned a thioether heat stabilizer, a phosphite heat stabilizer and a phenol heat stabilizer having a molecular weight of 500 or more. As a thioether heat stabilizer, dialkyl-3,3'-thiodipropionate, tetrakis[methylene-3-(alkylthio)propionate]methane and bis[2-methyl-4-(3-alkyl-thiopropyonyloxy)-5-tertbutylphenyl] sulfide are preferred. As a phosphite heat stabilizer, a compound having a pentaerythritol skeleton in the molecule thereof is preferred, and especially preferred are di(2,4-di-tert-butylphenyl)pentaerythritol diphosphite and bis(2,6-di-tert-butyl-4-methylphenyl)pentaerythritol diphosphite). As a phenol heat stabilizer, a hindered phenol compound in which the properties of a phenolic hydroxyl group are masked and which has a molecular weight of 500 or more is preferred.

Especially preferred are n-octadecyl-3-(3',5'-di-tert-butyl-4'-hydroxyphenyl)propionate and triethyleneglycol-bis[3-(3-tert-butyl-5-methyl-4-hydroxyphenyl)propionate]. These additives can be used in amounts which are generally used in various conventional aromatic polycarbonate resin compositions.

There is no particular limitation with respect to the method for producing the resin composition of the present invention, and conventional methods for producing a resin composition can be employed. Specifically, a resin composition can be produced by melt blending which comprises mixing the essential and optional components of the resin composition with each other and melt-kneading and extruding the resultant mixture using a single-screw extruder, a twin-screw extruder, a Banbury mixer or the like.

There is no particular limitation with respect to the method for molding (shaping) the polycarbonate resin composition of the present invention. Examples of methods for molding the resin composition include extrusion molding, compression molding, injection molding and gas-assisted injection molding. Among these methods, injection molding is preferred.

Examples of shaped articles which can be produced from the resin composition include housings for hand-held personal computers, copying machines and printing machines; chassis for office automation machines; and housings for hand-held telephones.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, polycarbonate resin compositions were produced using the following components (A), (B), (C), (D) and (E), except that the component (D) was not used in Comparative Examples 2 and 4 through 8. Further, it should be noted that some component products used herein for comparison do not satisfy the requirements for the components (A) to (E) of the polycarbonate resin composition of the present invention; however, these comparative components are also classified into the components (A) to (E) for the sake of convenience.

Component (A): Aromatic Polycarbonate
(PC1)
A bisphenol A polycarbonate produced by the molten-state transesterification process, which has a weight average molecular weight (MW) of 20,900 and terminal phenolic groups in an amount of 33%, based on the number of all terminal groups (hereinafter, the percentage is referred to simply as a "terminal phenolic group ratio"), was used as PC1.
(PC2)
A bisphenol A polycarbonate produced by the molten-state transesterification process, which has an MW of 20,000 and a terminal phenolic group ratio of 35%, was used as PC2.
(PC3)
A bisphenol A polycarbonate produced by the molten-state transesterification process, which has an MW of 25,000 and a terminal phenolic group ratio of 30%, was used as PC3.

Component (B): Copolymer Comprising an Aromatic Vinyl Monomer Unit (b-1) and a Vinyl Cyanide Monomer Unit (b-2)
(SAN)
Acrylonitrile-styrene copolymer having a weight average molecular weight of 140,000 was used as SAN. SAN had the following composition.

| | |
|---|---|
| Acryronitrile unit content: | 25.0% by weight |
| Styrene unit content: | 75.0% by weight |

(BAAS)
Butyl acrylate-acrylonitrile-styrene copolymer having a weight average molecular weight of 100,000 was used as BAAS. BAAS had the following composition.

| | |
|---|---|
| Butyl acrylate unit content: | 10.0% by weight |
| Acryronitrile unit content: | 27.0% by weight |
| Styrene unit content: | 63.0% by weight |

Component (C): Cyanide-containing, Graft Copolymer
(ABS)
A commercially available powdery ABS resin (trade name: RC, manufactured and sold by Mitsubishi Rayon Co., Ltd., Japan), in which less than 90% of the resin remains on a 10-mesh sieve, was used as ABS.

Component (D): (Meth)acrylate-containing, Graft Copolymer
(MBS1)
A commercially available methyl (meth)acrylate-butadiene-styrene copolymer (trade name: Metablen C-223A, manufactured and sold by Mitsubishi Rayon Co., Ltd., Japan) was used as MBS1.
(MBS2)
A commercially available methyl (meth)acrylate-butadiene-styrene copolymer (trade name: Metablen C-323A, manufactured and sold by Mitsubishi Rayon Co., Ltd., Japan) was used as MBS2.
(MBS3)
A commercially available methyl (meth)acrylate-butadiene-styrene copolymer (trade name: Kane Ace M-511, manufactured and sold by KANEKA CORP., Japan) was used as MBS3.
(MBS4)
A methyl (meth)acrylate-butadiene-styrene copolymer produced in the following manner was used as MBS4.

6,000 g of a polybutadiene latex (nonvolatiles content: 40% by weight, average particle diameter: 0.2 $\mu$m), 1,800 g of deionized water, 30 g of potassium rosinate, 2.1 g of ethylenediaminetetraacetic acid (EDTA), 1.8 g of sodium formaldehyde sulfoxylate and 0.3 g of iron(II) sulfate were placed in a 10-liter glass reactor equipped with an agitator, thereby obtaining mixture 1. Mixture 1 thus obtained was heated to 70° C. Mixture 2 consisting of 540 g of methyl meth(acrylate), 60 g of styrene, 3.6 g of cumene hydroperoxide and 2.1 g of t-dodecylmercaptan, and an aqueous solution containing 1.8 g of sodium formaldehyde sulfoxylate were continuously added to mixture 1 in the reactor over a period of 1.5 hours while agitating the resultant mixture. After completion of the above-mentioned addition, the resultant mixture in the reactor was further agitated for 1 hour to thereby mature the polymers. The copolymers contained in the reaction mixture were solidified by using sulfuric acid, and the solidified copolymers were washed and dried to thereby obtain a methyl methacryate-butadiene-styrene copolymer.

Component (E): Organic Phosphorus Compound Oligomer
(E1)
An organic phosphorus compound oligomer represented by formula (1) above, wherein all of the groups $R^a$, $R^b$, $R^c$ and $R^d$ are phenyl groups, was used as E1. E1 had a weight average polymerization degree (N) of 1.08 and an acid value of 0.45 mg KOH/g.
(E2)
An organic phosphorus compound oligomer represented by formula (1) above, wherein the ratio of the number of xylyl groups to the number of phenyl groups in the compound is 1:1, was used as E2. E2 had a weight average polymerization degree (N) of 1.15 and an acid value of 0.63 mg KOH/g.
(E3)
Triphenylphosphate (TPP) (manufactured and sold by Daihachi Chemical Industry Co., Ltd., Japan) was used as E3.
(E4)
An organic phosphorus compound oligomer represented by formula (1) above, wherein all of the groups $R^a$, $R^b$, $R^c$ and $R^d$ are phenyl groups, was used as E4. E4 had a weight average polymerization degree (N) of 1.12 and an acid value of 0.09 mg KOH/g.
(E5)
An organic phosphorus compound oligomer represented by formula (1) above, wherein all of the groups $R^a$, $R^b$, $R^c$ and $R^d$ are phenyl groups, was used as E5. E5 had a weight average polymerization degree (N) of 1.14 and an acid value of 1.12 mg KOH/g.
Other Components
(Fluoro Resin: PTFE)
A commercially available polytetrafluoroethylene (PTFE) (trade name: Teflon 30J, manufactured and sold by Du Pont-Mitsui Fluorochemical Co., Ltd., Japan; aqueous dispersion type; PTFE content: 60% by weight) was used as PTFE.
(Methyl Methacrylate-butadiene Copolymer: MB)
A commercially available methyl methacrylate-butadiene copolymer (trade name: Kureha Paraloid EXL2602, manufactured and sold by Kureha Chemical Industry Co., Ltd., Japan) was used as MB.
(Silicone-acrylic Complex Rubber)
A commercially available silicone-acrylic complex rubber (trade name: Metabulen S-2001, manufactured and sold by Mitsubishi Rayon Co., Ltd., Japan) was used as a silicone-acrylic complex rubber.
A silicone-acrylic complex rubber is a rubbery graft copolymer obtained by graft polymerizing methyl methacrylate onto a complex rubber having a network structure in which a polyorganosiloxane component and a polyalkyl (meth)acrylate rubber component are entangled with each other.

(Methyl Methacrylate-butyl Acrylate Copolymer: MBA)
A commercially available methyl methacrylate-butyl acrylate copolymer (trade name: Kane Ace FM-21, manufactured and sold by KANEKA CORP., Japan) was used as MBA.

EXAMPLES 1 THROUGH 3 AND COMPARATIVE EXAMPLE 1

The components (A), (B), (C) and (D) were mixed with each other in the amounts (unit: part by weight) indicated in Table 1. The resultant mixture was melt-kneaded using a twin-screw extruder (ZSK-25, manufactured and sold by Werner & Pfleiderer GmbH, Germany) having a cylinder temperature of 250° C., and the resultant melt-kneaded mixture was subjected to pelletization to thereby obtain pellets. During the melt-kneading of the components (A), (B), (C) and (D), the component (E), which is a flame retardant, was added to the extruder in the following manner. The component (E) was preliminarily heated to 90° C. and was injected into the extruder, by means of a gear pump, through an injection nozzle located at the middle of the extruder.

The obtained pellets were subjected to an injection molding using an injection molding machine (AUTO-SHOT 50D, manufactured and sold by FANUC LTD., Japan) at a molding temperature of 240° C., to thereby obtain test specimens (thickness: 1/10 inch or 1/16 inch) for evaluating the flame retardancy of the resin composition. The level of flame retardancy was evaluated by the 500MW Vertical Burning Test (5VB) described in UL-Subject 94 (thickness of the test specimen: 1/10 inch) and by the 20MM Vertical Burning Test described in UL-Subject 94 (the evaluations with the codes "V-0", "V-1" and "V-2" were conducted (degree of flame retardancy: V-0>V-1>V-2)) (thickness of the test specimen: 1/16 inch).

The results are shown in Table 1. As is apparent from Table 1, the resin composition produced in Comparative Example 1 (in which the amount of component (A) was outside the range of the present invention) did not exhibit a high flame retardancy which is an objective of the present invention.

TABLE 1

|  |  | Ex. 1 | Ex. 2 | Ex. 3 | Comp. Ex. 1 |
|---|---|---|---|---|---|
| Component (A) | PC1 (parts by weight) | 83 | 75 | 65 | 45 |
| Component (B) | SAN (parts by weight) | 8 | 10 | 17 | 35 |
| Component (C) | ABS (parts by weight) | 6 | 7 | 15 | 17 |
| Component (D) | MBS1 (parts by weight) | 3 | 3 | 3 | 3 |
| Component (E) | Organic phosphorus compound (E2) (parts by weight) | 15 | 15 | 15 | 15 |
| Other Component | PTFE (nonvolatiles content) (parts by weight) | 0.3 | 0.3 | 0.3 | 0.3 |
| Flame Retardancy | 500 MW Vertical Burning Test described in UL-Subject 94 (Thickness of test specimen: 1/10") | 5 VB | 5 VB | —*1) | —*1) |
|  | 20 MM Vertical Burning Test described in UL-Subject 94 (Thickness of test specimen: 1/16") | V-0 | V-1 | V-2 | —*2) |

Notes:
*1): The resin composition did not satisfy the requirements for 5 VB.
*2): The resin composition did not satisfy the requirements for V-2.

EXAMPLES 4 THROUGH 8 AND COMPARATIVE EXAMPLES 2 AND 3

Using the formulations indicated in Table 2, pellets of polycarbonate resin compositions were produced in the same manner as in Examples 1 through 3 and Comparative Example 1. Using the obtained pellets, the resin compositions were evaluated as follows.

(1) Flame Retardancy

The obtained pellets of a polycarbonate resin composition were dried and subjected to an injection molding at a cylinder temperature of 260° C. and a mold temperature of 65° C. to thereby obtain test specimens (thickness: 1/10 inch or 1/16 inch). The flame retardancy of a resin composition was evaluated by the Vertical Burning Test described in UL-Subject 94. Specifically, the 500MW Vertical Burning Test described in UL-Subject 94 was conducted using a 1/10 inch-thick test specimen, and the afterflame time of each of the five test specimens was also measured. The "total afterflame time" is the total of the afterflame times individually measured for the five test specimens (unit: seconds). In addition, the 20MM Vertical Burning Test described in UL-Subject 94 was conducted using a 1/16 inch-thick test specimen.

(2) Melt Flow Rate (MFR)

The melt flow rate (unit: g/10 min) was measured in accordance with ASTM-D1238, at 220° C. for 10 minutes under a load of 10 kg.

(3) Izod Impact Strength

The Izod impact strength was measured in accordance with ASTM-D256, using a notched test specimen having a thickness of 1/8 inch (unit: kgf.cm/cm). The test specimens were prepared by subjecting a resin composition to an injection molding at a cylinder temperature of 240° C. and a mold temperature of 65° C.

(4) Heat Distortion Temperature (HDT)

The heat distortion temperature (unit: °C.) was measured in accordance with ASTM-D648, using a test specimen having a thickness of 1/8 inch, under a load of 18.6 kgf/cm².

(5) Stability in Mechanical Properties

As a supplemental evaluation for determining the stability in mechanical properties, the resistance of a resin composition to high temperature and high humidity conditions was tested as follows. A 1/4 inch-thick test specimen prepared by subjecting a resin composition to injection molding at a cylinder temperature of 240° C. and a mold temperature of 65° C. was placed under high temperature and high humidity conditions for 200 hours, wherein the temperature was 70° C. and RH (relative humidity) was 95%. Subsequently, the Izod impact strength of the resultant test specimen was measured in accordance with ASTM-D256 using a notched test specimen (thickness: 1/4 inch) (unit: kgf.cm/cm). In addition, the retention of the Izod impact strength, relative to the Izod impact strength of an intact test specimen, was determined for the test specimen placed under high temperature and high humidity conditions. A retention of 100% means that the Izod impact strength did not decrease even after placing the test specimen under high temperature and high humidity conditions.

(6) Evaluation of Mold Deposit (MD)

Test specimens (weight: 4 g) were continuously produced by subjecting a polycarbonate resin composition to a continuous injection molding using an injection molding machine (NIIGATA CN75, manufactured and sold by NIIGATA ENGINEERING CO., LTD., Japan) under the following conditions: cylinder temperature: 260° C., mold temperature: 40° C., injection time: 3 seconds, cooling time: 1.2 seconds, interval time: 2 seconds and molding cycle: 8.3 seconds. The surface conditions of the mold individually after 100 shots, 500 shots, 1,000 shots and 2,000 shots were evaluated by visual observation. The level of MD was evaluated in accordance with the following criteria.

| | |
|---|---|
| ⊚: | MD did not occur during 2,000 shots. |
| ○: | MD occurred between the 1,001st shot and 2,000th shot. |
| Δ: | MD occurred between the 101st shot and the 1,000th shot. |
| X: | MD occurred during the first 100 shots. |

The results of the above-mentioned evaluations are shown in Table 2.

TABLE 2

| | | Ex.4 | Ex.5 | Ex.6 | Ex.7 | Ex.8 | Comp. Ex.2 | Comp. Ex.3 |
|---|---|---|---|---|---|---|---|---|
| Component (A) | PC1 (parts by weight) | 80 | 75 | 85 | 85 | 90 | 80 | 80 |
| Component (B) | SAN (parts by weight) | 10 | — | 5 | — | 5 | 10 | 10 |
| | BAAS (parts by weight) | — | 12 | — | 5 | — | — | — |
| Component (C) | ABS (parts by weight) | 7 | 9 | 7 | 7 | 3 | 10 | 7 |
| | MBS1 (parts by weight) | 3 | — | 3 | — | — | — | 3 |
| Component (D) | MBS2 (parts by weight) | — | — | — | 3 | — | — | — |
| | MBS3 (parts by weight) | — | 4 | — | — | 2 | — | — |
| Component (E) | Organic phosphorus compound (E1) (parts by weight) | 13 | 15 | — | — | — | 13 | — |
| | Organic phosphorus compound (E2) (parts by weight) | — | — | 15 | 15 | 12 | — | — |
| | Organic phosphorus compound (E3) (parts by weight) | — | — | — | — | — | — | 13 |
| Other component | PTFE (nonvolatiles content) (parts by weight) | 0.3 | 0.3 | 0.3 | 0.3 | 0.3 | 0.3 | 0.3 |
| Proparties | 500 MW Vertical Burning Test described in UL-Subject 94 (Thickness of test specimen: 1/10") | 5 VB | 5 VB | 5 VB | 5 VB | 5 VB | 5 VB | 5 VB |
| | Total afterflame time (sec) | 35 | 40 | 32 | 27 | 25 | 43 | 28 |
| | 20 MM Vertical Burning Test described in UL-Subject 94 (Thickness of test specimen: 1/16") | V-0 | V-0 | V-0 | V-0 | V-0 | V-0 | V-0 |

TABLE 2-continued

|  | Ex.4 | Ex.5 | Ex.6 | Ex.7 | Ex.8 | Comp. Ex.2 | Comp. Ex.3 |
|---|---|---|---|---|---|---|---|
| MFR (g/10 min) | 42 | 55 | 18 | 42 | 35 | 35 | 58 |
| Izod impact strength (kgf·cm/cm) (Thickness of test specimen: 1/8") | 48 | 51 | 53 | 54 | 55 | 12 | 58 |
| HDT (° C.) | 83.5 | 82.5 | 88.5 | 89.2 | 90.5 | 83.2 | 79.5 |
| Resistance to high temp. and high humidity (70° C. 95 RH%) | | | | | | | |
| Izod impact strength measured after placing a test specimen under high temp. and high humidity conditions for 200 hrs. (kgf·cm/cm) (Thickness of test specimen: 1/4") | 13 | 15 | 22 | 25 | 19 | 4 | 18 |
| Retention of Izod impact strength (%) | 48 | 53 | 70 | 73 | 68 | 42 | 60 |
| Occurrence of MD | ○ | ○ | ⊙ | ⊙ | ⊙ | ○ | x |

The resin composition produced in each of Examples 4 to 8 had not only a high flame retardancy, but also a high melt fluidity, a high impact resistance and a high thermal stability. In addition, the resin composition had an excellent stability in mechanical properties and the occurrence of MD was small. Especially, the resin composition produced in each of Examples 6, 7 and 8 had excellent thermal resistance and excellent stability in mechanical properties, and the occurrence of MD was greatly suppressed.

On the other hand, the resin composition produced in Comparative Example 2 (in which a component (D) was not used) had poor impact resistance, and the resin composition produced in Comparative Example 3 (in which a monophosphoric ester (TPP) was used as a flame retardant) suffered a large occurrence of MD.

As is apparent from FIG. 2 which is the TEM photomicrograph of the resin composition produced in Example 4, in the present invention, the rubber-containing component (D) (i.e., the black or dark gray dots shown in the TEM photomicrograph of FIG. 2) is dispersed not only in the domains formed by the component (B) (i.e., the white domains shown in the TEM photomicrograph of FIG. 2), but also in the component (A) which forms the matrix of the resin composition. On the other hand, as is apparent from FIG. 3 which is the TEM photomicrograph of the resin composition produced in Comparative Example 2 (in which the rubber-containing component (D) was not used), almost all of the rubber-containing component (C) (i.e., the black or dark gray dots shown in the TEM photomicrograph of FIG. 3) is dispersed in only the domains formed by the component (B) (i.e., the white domains shown in the TEM photomicrograph of FIG. 3) and, therefore, almost no rubbery component is dispersed in the component (A).

The above-mentioned dispersion morphology of the resin composition of the present invention is considered to greatly contribute to an excellent melt stability and an excellent impact resistance.

EXAMPLES 9 THROUGH 12, COMPARATIVE EXAMPLES 4 THROUGH 7

Using the formulations indicated in Table 3, polycarbonate resin compositions were produced in the same manner as in Examples 1 through 3. MFR values (220° C. with a load of 10 kg) and Izod impact strengths (notched specimen, 1/8 inch thick) of the produced resin compositions were evaluated in the same manner as in Examples 9 to 12.

The results are shown in Table 3.

Further, FIG. 1 has been prepared using the results of the evaluation of the resin composition produced in each of Examples 9 through 12 and Comparative Examples 4 through 7. FIG. 1 is a graph showing the relationship between the rubbery polymer content (unit: % by weight) of the resin composition, relative to 100 parts by weight of the resin composition (the total amount of the components (A), (B), (C) and (D) is 100 parts by weight), and the melt flow rate (MFR) and impact resistance (Izod impact strength) of the resin composition. As is apparent from FIG. 1, the resin composition produced in each of Examples 4 through 8 (in which the components (C) and (D) were used in combination as a graft rubbery component) showed an excellent balance between the melt fluidity and the impact resistance, as compared to that of a resin composition produced in each of Comparative Examples 4 to 7 (in which only component (C) was used as a graft rubbery component).

TABLE 3

|  |  | Ex. 9 | Ex. 10 | Ex. 11 | Ex. 12 | Comp. Ex. 4 | Comp. Ex. 5 | Comp. Ex. 6 | Comp. Ex. 7 |
|---|---|---|---|---|---|---|---|---|---|
| Component (A) | PC2 (parts by weight) | 80 | 80 | 80 | 80 | 80 | 80 | 80 | 80 |
| Component (B) | SAN (parts by weight) | 12 | 11 | 10 | 9 | 12 | 10 | 8 | 6 |
| Component (C) | ABS (parts by weight) | 5 | 6 | 7 | 8 | 8 | 10 | 12 | 14 |

TABLE 3-continued

|  |  | Ex. 9 | Ex. 10 | Ex. 11 | Ex. 12 | Comp. Ex. 4 | Comp. Ex. 5 | Comp. Ex. 6 | Comp. Ex. 7 |
|---|---|---|---|---|---|---|---|---|---|
| Component (D) | MBS1 (parts by weight) | 3 | 3 | 3 | 3 | — | — | — | — |
| Component (E) | Organic phosphorus compound (E1) (parts by weight) | 14 | 14 | 14 | 14 | 14 | 14 | 14 | 14 |
| Other component | PTFE (nonvolatiles content) (parts by weight) | 0.3 | 0.3 | 0.3 | 0.3 | 0.3 | 0.3 | 0.3 | 0.3 |
| Properties | MFR (g/10 min) (220° C. 10 kgf) | 45 | 42 | 41 | 40 | 42 | 37 | 35 | 32 |
|  | Izod impact strength (kgf·cm/cm) (Thickness of test specimen: 1/8") | 13 | 47 | 55 | 58 | 11 | 13 | 45 | 48 |
|  | Rubbery polymer content of the resin composition (% by weight) | 5.15 | 5.7 | 6.25 | 6.8 | 4.4 | 5.5 | 6.6 | 7.7 |

EXAMPLES 13 THROUGH 15

Using the formulations indicated in Table 4, polycarbonate resin compositions were produced in the same manner as in Examples 1 through 3. The manner in which the Izod impact strengths (notched specimen, 1/8 inch thick) of the produced resin compositions change with time under high temperature and high humidity conditions (60° C., 85 RH %) was evaluated.

The results are shown in Table 4.

As is apparent from Table 4, the degree of improvement in resistance to the high temperature and high humidity conditions increases in accordance with the decrease in the acid value of the component (E) used in the resin composition.

EXAMPLE 16 AND COMPARATIVE EXAMPLES 8

Using the formulations indicated in Table 5, polycarbonate resin compositions were produced in the same manner as in Examples 1 through 3. The manner in which the Izod impact strengths (notched specimen, 1/8 inch thick) of the produced resin composition change with time under high temperature and high humidity conditions (60° C., 85 % RH (relative humidity)) was evaluated.

As a result, it was found that the resin composition produced in Example 16 (in which components (C) and (D) were used in combination as a graft rubbery component) had a stable mechanical property, as compared to that of the resin composition produced in Comparative Example 8 (in which only component (C) was used as a graft rubbery component).

TABLE 4

|  |  |  | Ex. 13 | Ex. 14 | Ex. 15 |
|---|---|---|---|---|---|
| Component (A) | PC1 (parts by weight) |  | 82 | 82 | 82 |
| Component (B) | SAN (parts by weight) |  | 8 | 8 | 8 |
| Component (C) | ABS (parts by weight) |  | 7 | 7 | 7 |
| Component (D) | MBS1 (parts by weight) |  | 3 | 3 | 3 |
| Component (E) | Organic phosphorus compound (E1) (parts by weight) |  | 14 | — | — |
|  | Organic phosphorus compound (E4) (parts by weight) |  | — | 14 | — |
|  | Organic phosphorus compound (E5) (parts by weight) |  | — | — | 14 |
| Other component | PTFE (nonvolatiles content) (parts by weight) |  | 0.3 | 0.3 | 0.3 |
| Resistance to the high temp. and high humidity conditions (Izod impact strength (kgf·cm/cm) measured after placing the test specimen under high temp., high humidity conditions (60° C., 85 RH %) for prescribed period of time) (notched specimen; thickness: 1/8") | 0 hour |  | 52 | 54 | 49 |
|  | 50 hours |  | 46 | 50 | 42 |
|  | 100 hours |  | 40 | 47 | 35 |
|  | 200 hours |  | 36 | 43 | 28 |

TABLE 5

|  |  | Ex. 16 | Comp. Ex. 8 |
|---|---|---|---|
| Component (A) | PC3 (parts by weight) | 75 | 75 |
| Component (B) | SAN (parts by weight) | 12 | 12 |
| Component (C) | ABS (parts by weight) | 10 | 13 |
| Component (D) | MBS1 (parts by weight) | 3 | — |
| Component (E) | Organic phosphorus compound (E1) (parts by weight) | 14 | 14 |
| Other component | PTFE (nonvolatiles content) (parts by weight) | 0.3 | 0.3 |
| Resistance to the high temp. and high humidity conditions (Izod impact strength (kgf · cm/cm) measured after placing the test specimen under high temp., high humidity conditions (60° C., 85 RH %) for prescribed period of time) (notched specimen; thickness: 1/8") | 0 hours | 68 | 67 |
|  | 50 hours | 62 | 45 |
|  | 100 hours | 52 | 35 |
|  | 200 hours | 48 | 28 |
|  | 400 hours | 40 | 16 |

EXAMPLES 17 AND 18, AND COMPARATIVE EXAMPLES 9 THROUGH 11

Using the formulations indicated in Table 6, polycarbonate resin compositions were produced in the same manner as in Examples 1 through 3. The flame retardancies and MFR values (220° C. with a load of 10 kg) of the produced resin compositions were evaluated in the same manner as in Examples 4 through 8. Further, the Izod impact strengths and residential Izod impact strengths were measured using ⅛ inch-thick test specimens (notched specimen). The residential Izod impact strength is the Izod impact strength of a test specimen which has been prepared after allowing a resin composition to reside inside a molding machine (cylinder temperature: 240° C.) for 10 minutes.

The results are shown in Table 6.

by weight, and the weight ratio of styrene to methyl methacrylate in MBS1 is 50/50 (the total content of the grafted polymers in MBS1 is approximately 20% by weight). MBS4 used in Example 18 is a copolymer obtained by graft polymerizing styrene and methyl methacrylate onto a rubbery butadiene polymer, wherein the content of the rubbery butadiene polymer in MBS4 is approximately 80% by weight, and the weight ratio of styrene to methyl methacrylate contained in MBS4 is 10/90 (the total content of the grafted polymers in MBS4 is approximately 20% by weight). The resin composition produced in each of Examples 17 and 18 had an excellent flame retardancy and an excellent Izod impact strength. Further, each resin composition had an excellent residential Izod impact strength.

On the other hand, MB used in Comparative Example 9 is a styrene-free copolymer obtained by graft polymerizing

TABLE 6

|  |  | Ex. 17 | Ex. 18 | Comp. Ex. 9 | Comp. Ex. 10 | Comp. Ex. 11 |
|---|---|---|---|---|---|---|
| Component (A) | PC1 (parts by weight) | 78 | 78 | 78 | 78 | 78 |
| Component (B) | SAN (parts by weight) | 12 | 12 | 12 | 12 | 12 |
| Component (C) | ABS (parts by weight) | 7 | 7 | 7 | 7 | 7 |
| Component (D) | MBS1 (parts by weight) | 3 | — | — | — | — |
|  | MBS4 (parts by weight) | — | 3 | — | — | — |
| Other rubbery component | MB (parts by weight) | — | — | 3 | — | — |
|  | Silicone-acrylic-complex rubber (parts by weight) | — | — | — | 3 | — |
|  | MBA (parts by weight) | — | — | — | — | 3 |
| Component (E) | Organic phosphorus compound (E4) (parts by weight) | 15 | 15 | 15 | 15 | 15 |
| Other component | PTFE (nonvolatiles content) (parts by weight) | 0.3 | 0.3 | 0.3 | 0.3 | 0.3 |
| Properties | 500 MW Vertical Burning Test described in UL-Subject 94 (Thickness of test specimen: 1/10") | 5 VB | 5 VB | 5 VB | 5 VB | 5 VB |
|  | 20 MM Vertical Burning Test described in UL-Subject 94 (Thickness of test specimen: 1/16") | V-0 | V-0 | V-2 | V-0 | V-2 |
|  | MFR (g/10 min) | 44 | 45 | 43 | 45 | 47 |
|  | Izod impact strength (kgf·cm/cm) (Thickness of test specimen: 1/8") | 55 | 48 | 35 | 48 | 18 |
|  | Residential Izod impact strength (kgf·cm/cm) (10 min) | 55 | 47 | 20 | 42 | 13 |

MBS1 used in Example 17 is a copolymer obtained by graft polymerizing styrene and methyl methacrylate onto a rubbery butadiene polymer, wherein the content of the rubbery butadiene polymer in MBS1 is approximately 80% methyl methacrylate onto a rubbery butadiene polymer, wherein the contents of the rubbery butadiene polymer and methyl methacrylate in MB are approximately 80% by weight and 20% by weight, respectively. The silicone-acrylic complex rubber used in Comparative Example 10 is a stryrene-free copolymer obtained by graft polymerizing methyl methacrylate onto a rubbery polymer consisting of a polyorganosiloxane and a polyalkyl (meth)acrylate, wherein the contents of the rubbery polymer and methyl (meth) acrylate in the copolymer are approximately 80% by weight and 20% by weight, respectively. Further, MBA used in Comparative Example 11 is a styrene-free copolymer obtained by graft polymerizing methyl methacrylate onto a butyl acrylate rubber, wherein the contents of the butyl acrylate rubber and methyl methacrylate in MBA are approximately 80% by weight and 20% by weight, respectively. Each of the above-mentioned styrene-free copolymer components exhibits the ability to improve the impact resistance of the resin composition. However, the use of such a styrene-free copolymer component in the Comparative Examples resulted in either a decrease of the improvement in impact resistance or a decrease of the residential Izod impact resistance, as compared to those of the resin composition produced in each of Examples 17 and 18. In addition, the resin composition produced in each of Comparative Examples 9 and 11 suffered a lowering in flame retardancy.

INDUSTRIAL APPLICABILITY

The resin composition of the present invention not only simultaneously exhibits excellent melt fluidity, impact resistance, thermal resistance and flame retardancy, but also exhibits an excellent stability in mechanical properties. Further, the occurrence of mold deposit (MD) during the molding of such a resin composition is very small. By virtue of these properties, the resin composition of the present invention has advantages for use in various industrial fields.

What is claimed is:

1. A flame retardant polycarbonate resin composition comprising:

50 to 98 parts by weight of an aromatic polycarbonate (A), 0.1 to 49 parts by weight of a copolymer (B) comprising an aromatic vinyl monomer unit (b-1) and a vinyl cyanide monomer unit (b-2), 0.5 to 30 parts by weight of a cyanide-containing, graft copolymer (C) obtained by copolymerizing an aromatic vinyl compound (c-1) and a vinyl cyanide compound (c-2) in the presence of a rubbery polymer (c-3), 0.5 to 30 parts by weight of a (meth)acrylate-containing, graft copolymer (D) obtained by copolymerizing an aromatic vinyl compound (d-1) and an alkyl (meth) acrylate (d-2) in the presence of a rubbery butadiene polymer (d-3), and 0.1 to 30 parts by weight of at least one organic phosphorus compound oligomer (E), wherein the total amount of the components (A), (B), (C) and (D) is 100 parts by weight.

2. The polycarbonate resin composition according to claim 1, wherein said organic phosphorus compound oligomer (E) is selected from the group consisting of compounds represented by the following formula:

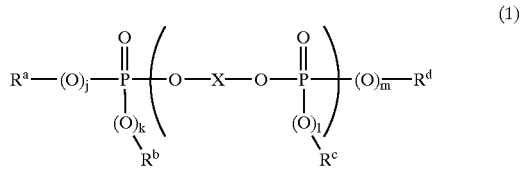

(1)

wherein:
   X represents

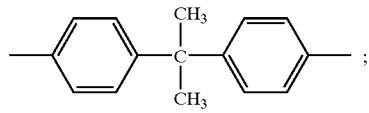

each of $R^a$, $R^b$, $R^c$ and $R^d$ independently represents a $C_6$–$C_{20}$ aryl group;
   n represents an integer of 1 to 5; and
   each of j, k, l and m independently represents 0 or 1.

3. The polycarbonate resin composition according to claim 2, wherein each of $R^a$, $R^b$, $R^c$ and $R^d$ in formula (1) independently represents a phenyl group or a xylyl group, with the proviso that each of said compounds of formula (1) contains at least one phenyl group and at least one xylyl group.

4. The polycarbonate resin composition according to claim 1, wherein the content of said rubbery butadiene polymer in said (meth)acrylate-containing, graft copolymer (D) is 65 to 95% by weight, and the weight ratio of said component (d-1) to said component (d-2) in said (meth) acrylate-containing, graft copolymer (D) is within the range of from 80/20 to 5/95.

5. The polycarbonate resin composition according to claim 1, wherein said aromatic polycarbonate (A) has a weight average molecular weight of from 15,000 to 30,000, and said copolymer (B) has a weight average molecular weight of from 50,000 to 180,000.

6. The polycarbonate resin composition according to claim 1, wherein said component (E) comprises a plurality of different organic phosphorus compound oligomers, wherein the weight average polymerization degree (N) of said plurality of different organic phosphorus compound oligomers (E) is in the range of from 1.0 to less than 1.2.

7. The polycarbonate composition according to claim 1, wherein said component (E) has an acid value of less than 1 mg KOH/g.

8. The polycarbonate resin composition according to claim 7, wherein said component (E) has an acid value of less than 0.1 mg KOH/g.

9. The polycarbonate resin composition according to claim 1, which further comprises a tetrafluoroethylene polymer.

* * * * *